(12) United States Patent
Muratani et al.

(10) Patent No.: US 7,194,090 B2
(45) Date of Patent: Mar. 20, 2007

(54) ENCRYPTION APPARATUS, DECRYPTION APPARATUS, EXPANDED KEY GENERATING APPARATUS AND METHOD THEREFOR, AND RECORDING MEDIUM

(75) Inventors: Hirofumi Muratani, Kawasaki (JP); Masahiko Motoyama, Yokohama (JP); Kenji Ohkuma, Yokohama (JP); Fumihiko Sano, Fuchu (JP); Shinichi Kawamura, Kodaira (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 756 days.

(21) Appl. No.: 09/902,696

(22) Filed: Jul. 12, 2001

(65) Prior Publication Data
US 2002/0021802 A1    Feb. 21, 2002

(30) Foreign Application Priority Data
Jul. 12, 2000    (JP)    ............................. 2000-211686

(51) Int. Cl.
H04K 1/00    (2006.01)
H04L 9/00    (2006.01)

(52) U.S. Cl. ............................. 380/29; 380/21; 380/42; 380/44; 380/45

(58) Field of Classification Search ................. 380/29, 380/21, 42, 44, 45
See application file for complete search history.

(56) References Cited

U.S. PATENT DOCUMENTS 5,202,922 A    4/1993    Iijima
5,432,848 A *  7/1995    Butter et al. .................... 380/2
5,745,577 A *  4/1998    Leech .......................... 380/28
5,796,837 A *  8/1998    Kim et al. ..................... 380/28
5,825,886 A * 10/1998    Adams et al. ................. 380/28
5,933,501 A *  8/1999    Leppek ........................ 380/259
6,185,679 B1 * 2/2001    Coppersmith et al. ....... 713/150
6,189,095 B1 * 2/2001    Coppersmith et al. ....... 713/150
6,243,470 B1 * 6/2001    Coppersmith et al. ....... 380/259

FOREIGN PATENT DOCUMENTS

EP    0982895 A2 *    1/2000
EP    0 982 895         3/2000
WO    WO 99/14889      3/1999
WO    WO 00/22777      4/2000

OTHER PUBLICATIONS

B. Schneier, Applied Cryptography, Second Edition, pp. 270-277, XP-002237575, 1996.
Alfred J. Menezes, et al., Handbook of Applied Cryptography, Chapter 7 Block Ciphers, pp. 250-259.

* cited by examiner

*Primary Examiner*—Ayaz Sheikh
*Assistant Examiner*—Kaveh Abrishamkar
(74) *Attorney, Agent, or Firm*—Oblon, Spivak, McClelland, Maier & Neustadt, P.C.

(57) ABSTRACT

Expanded key schedule circuit for common key encryption system in which expanded keys are used in a predetermined order in data randomizing process for encryption and in a reversed order in data randomizing process for decryption, comprises round processing circuits connected in series. The round processing circuits subject the common key or sub key of a previous stage to a round function to output a sub key. The sub key of the last stage is equal to the common key. The expanded keys are generated from the sub keys.

24 Claims, 32 Drawing Sheets

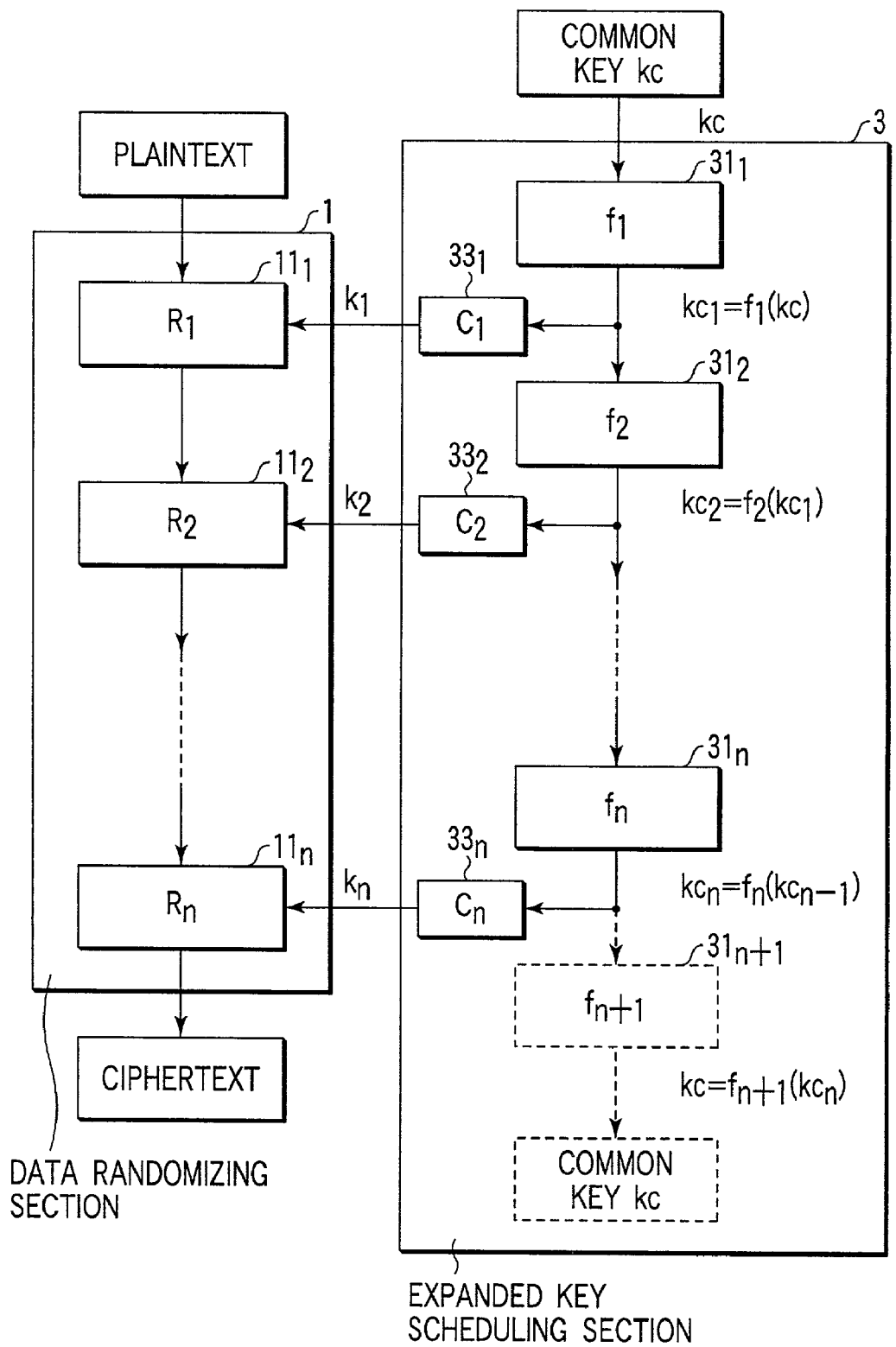
F I G. 1

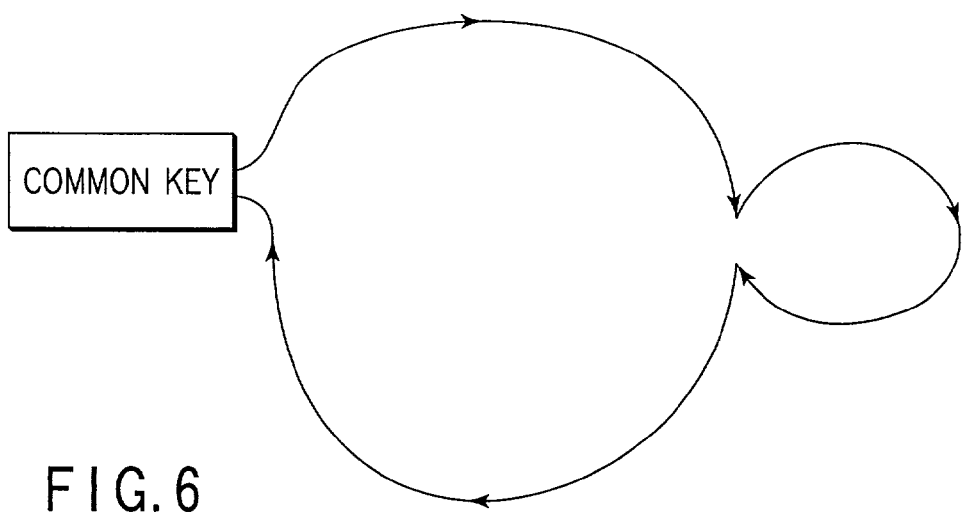
F I G. 6
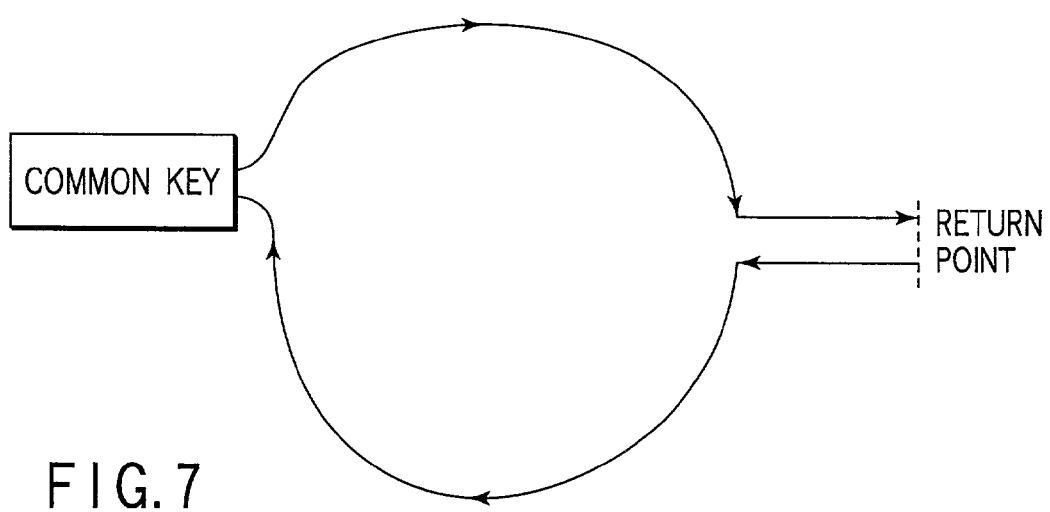
F I G. 7
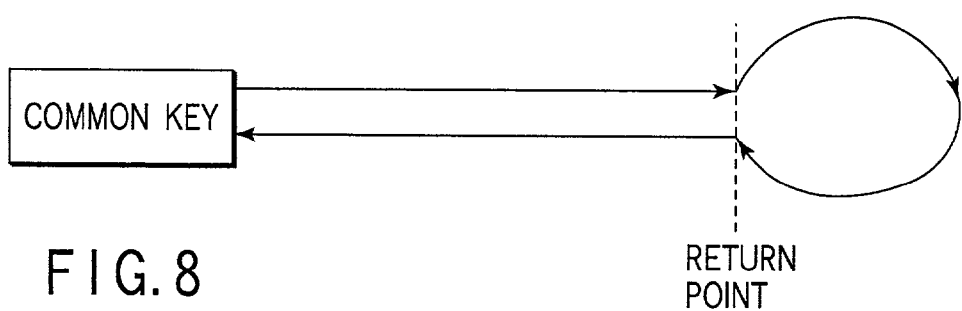
F I G. 8

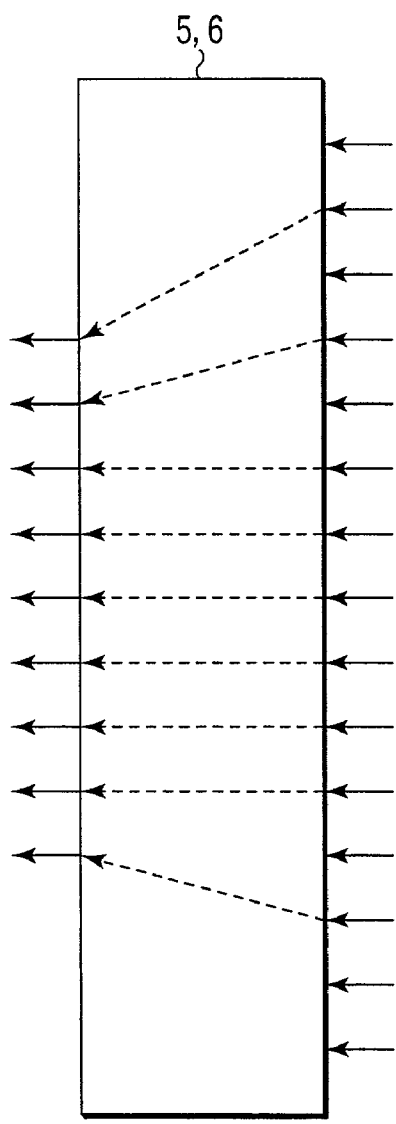 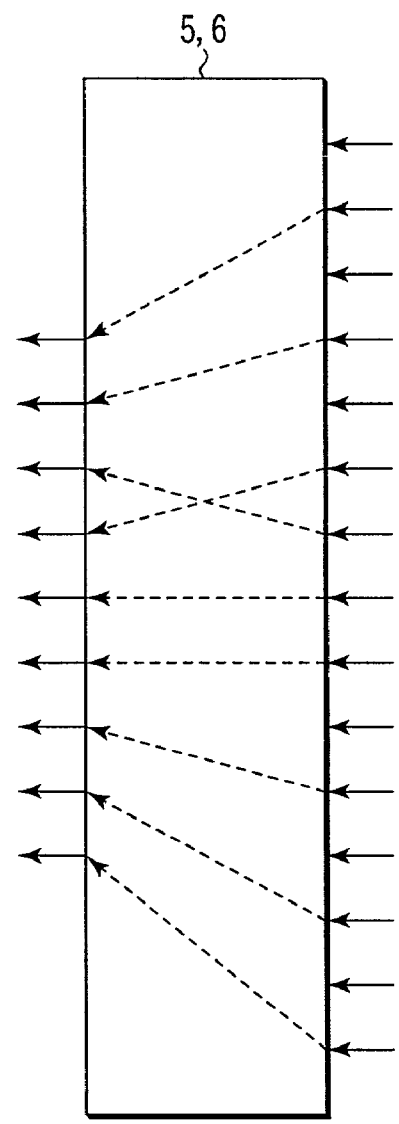
F I G. 14   F I G. 15

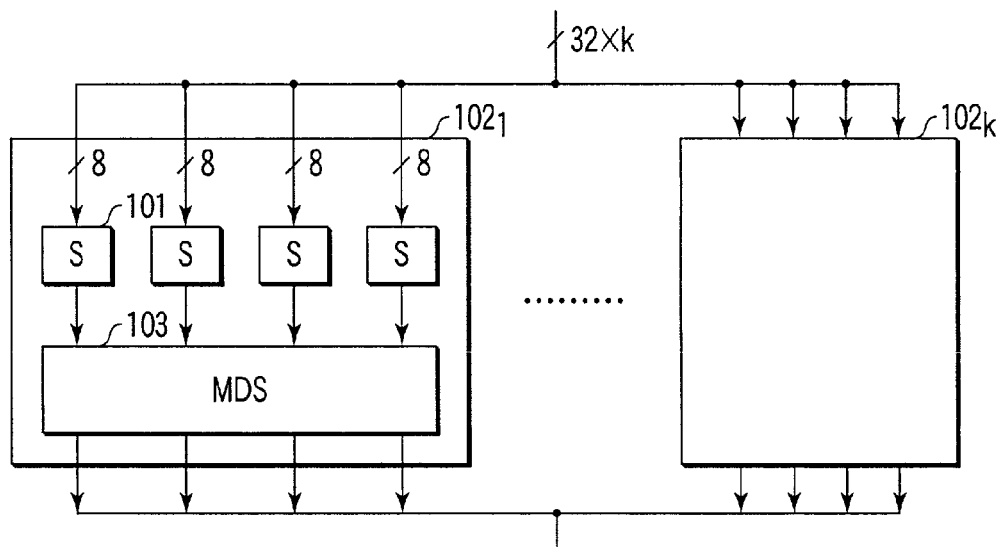
F I G. 19
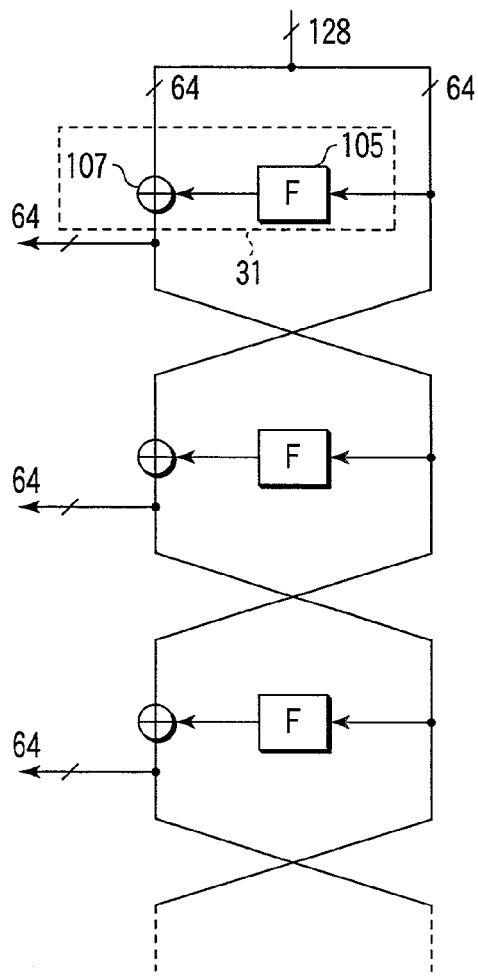
F I G. 20

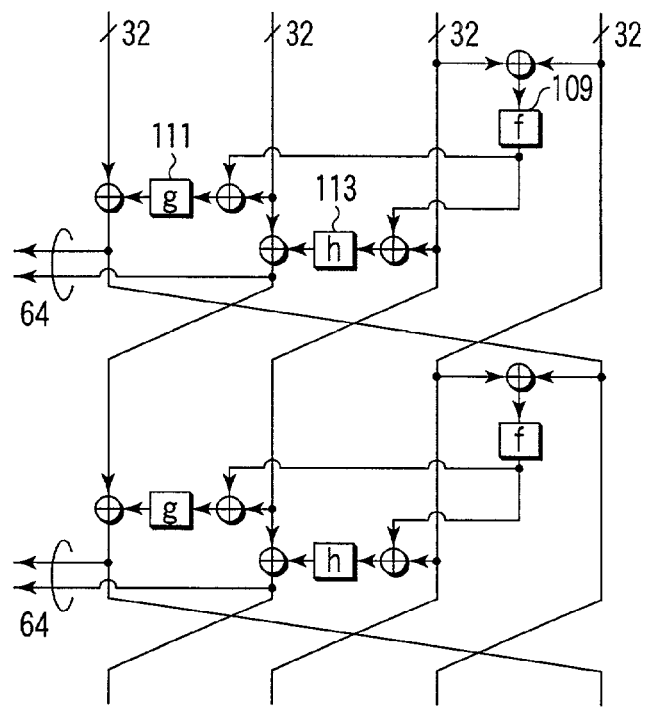
F I G. 21
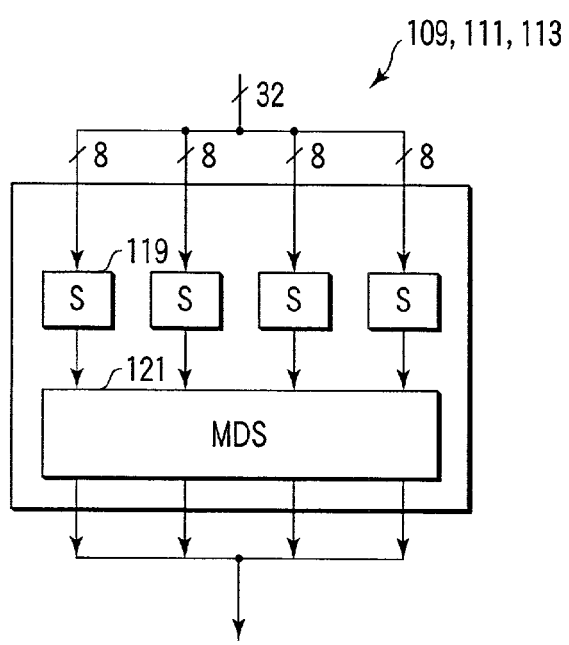
F I G. 22

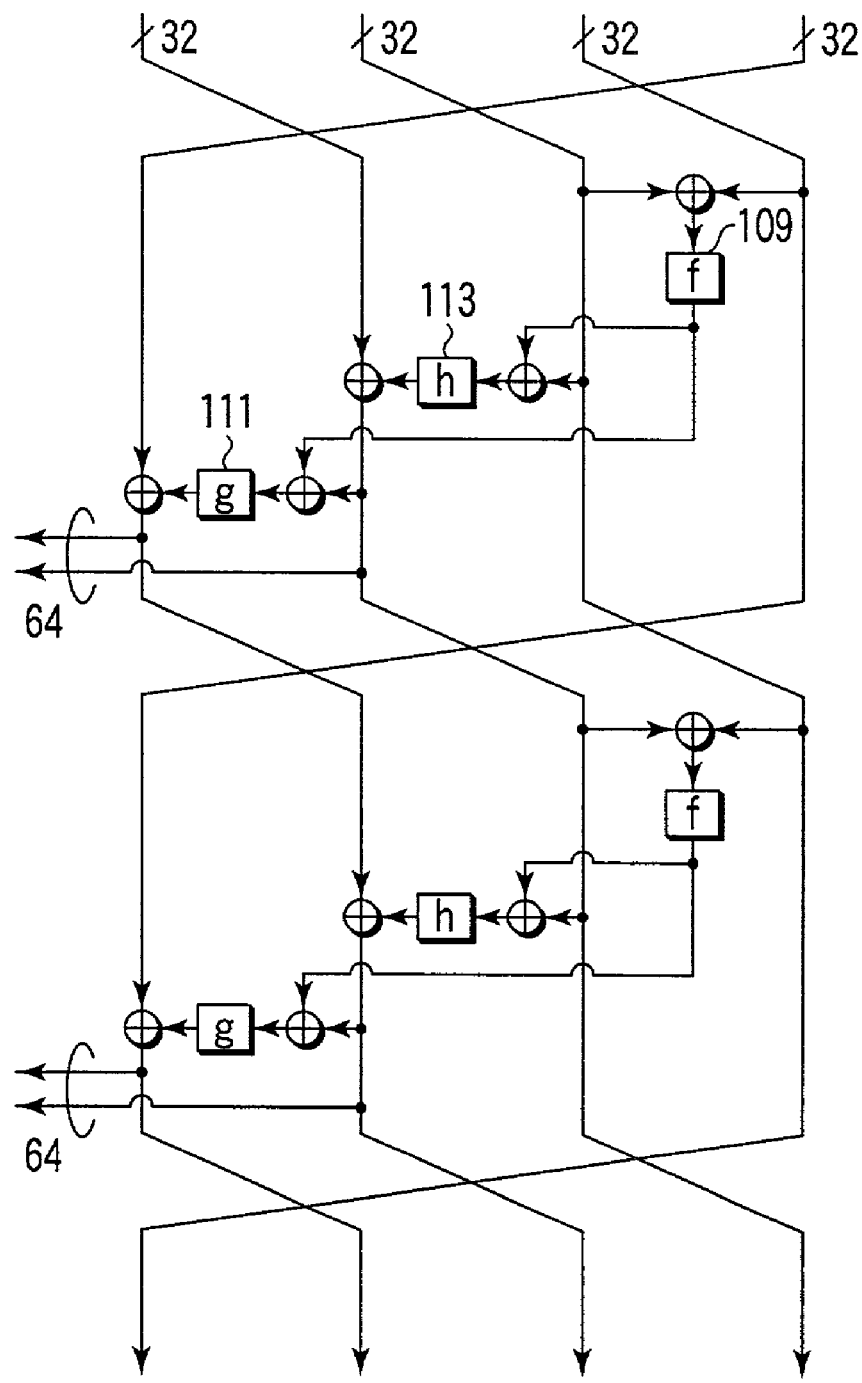
F I G. 23

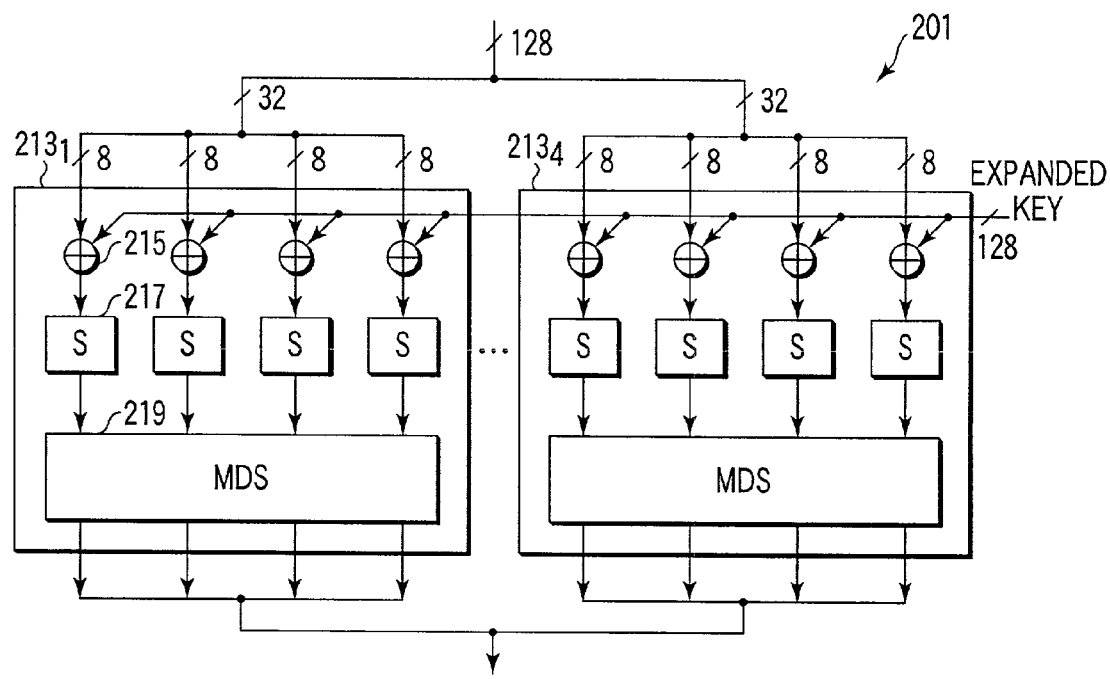
F I G. 25
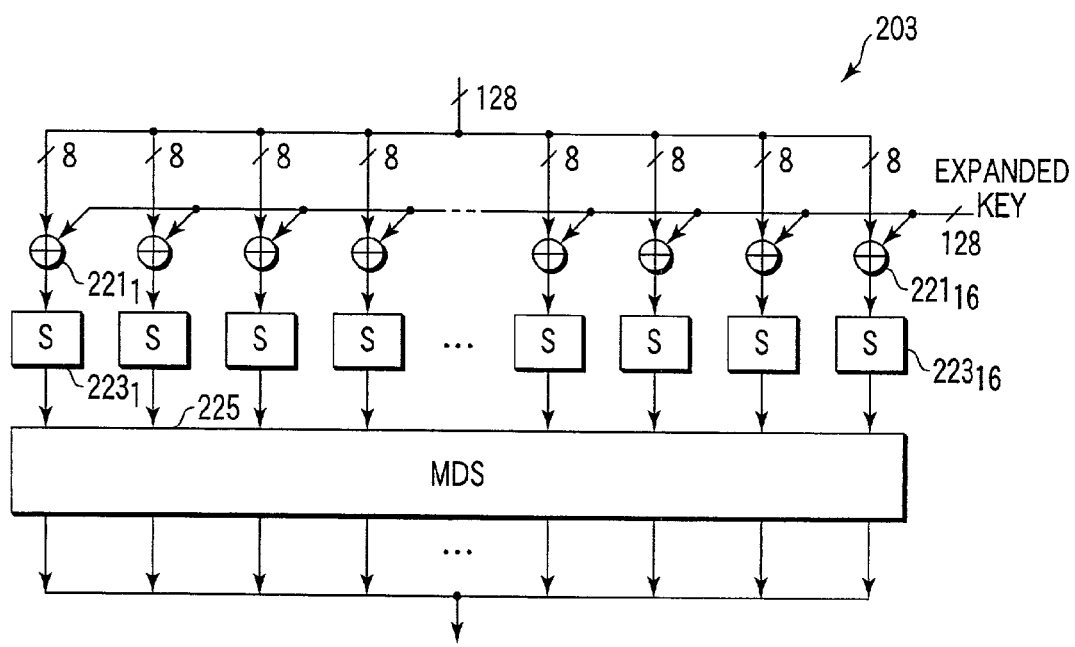
F I G. 26

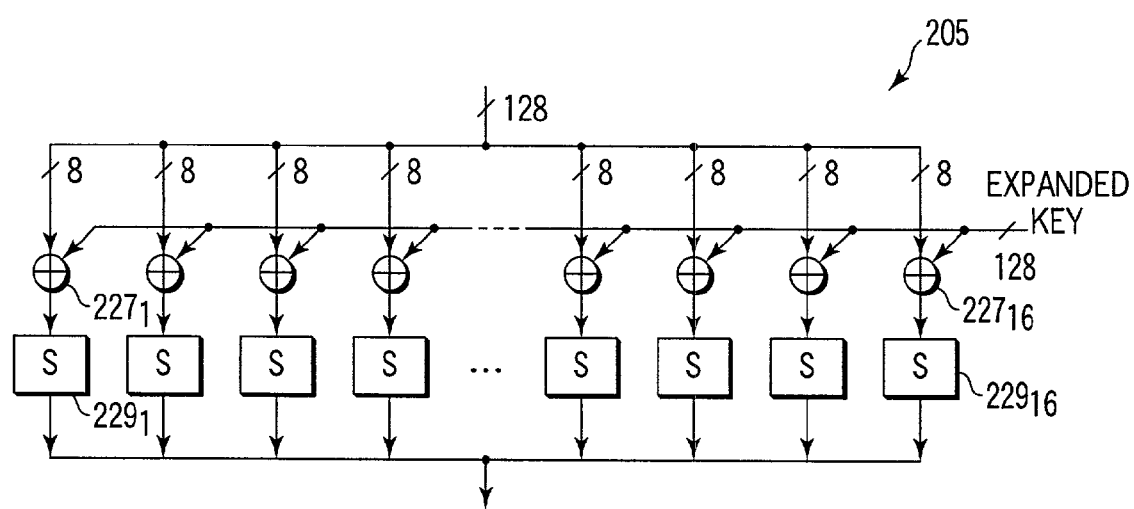
F I G. 27

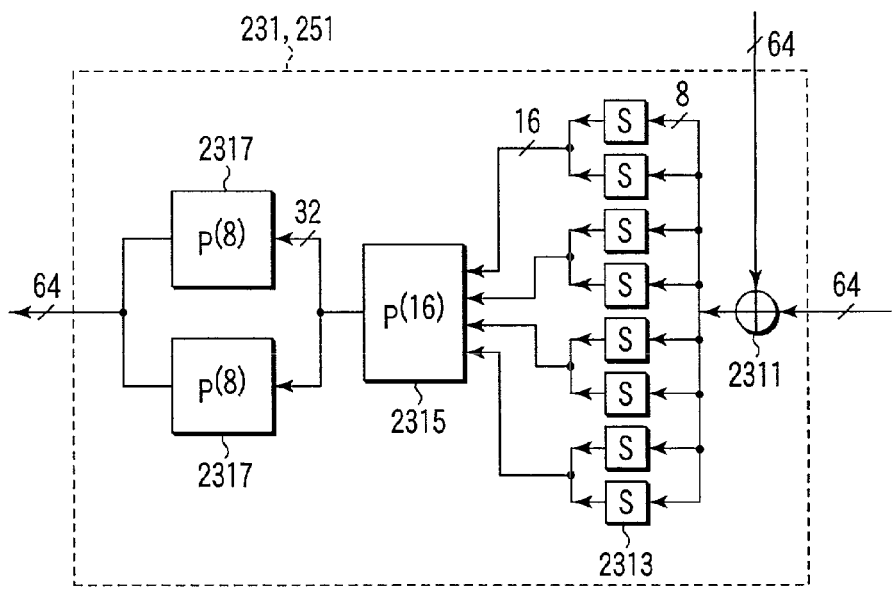
F I G. 30
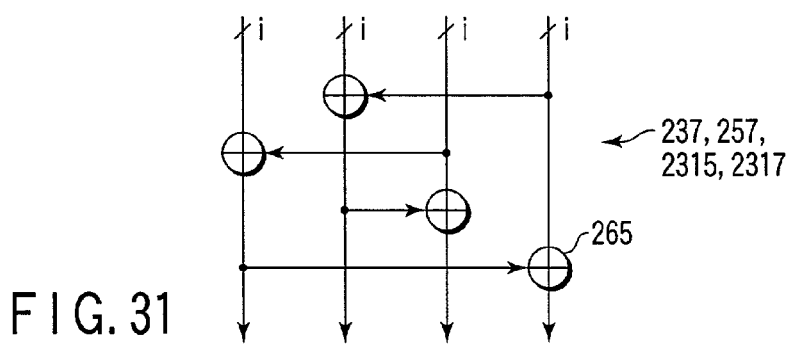
F I G. 31
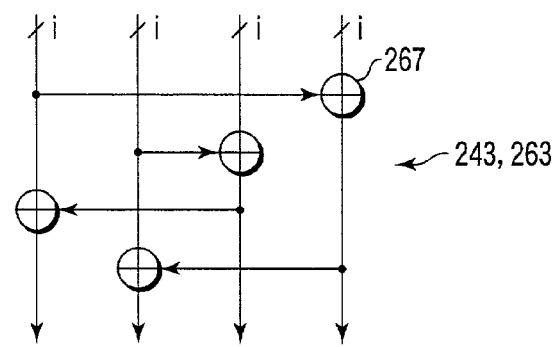
F I G. 32

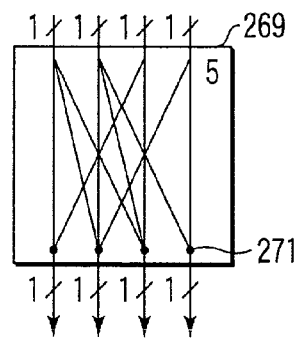 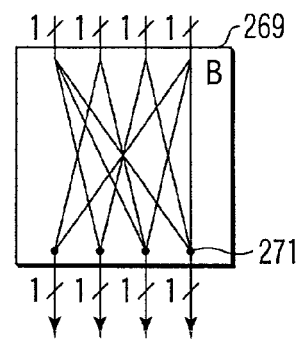
FIG. 34A  FIG. 34B
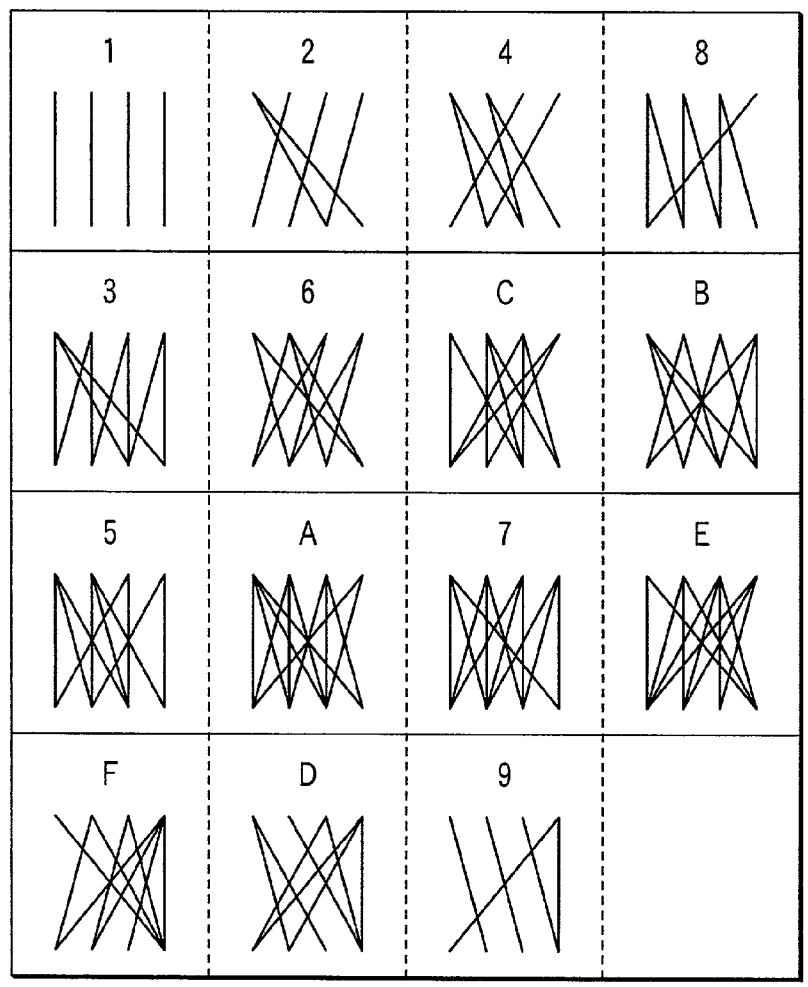
FIG. 35

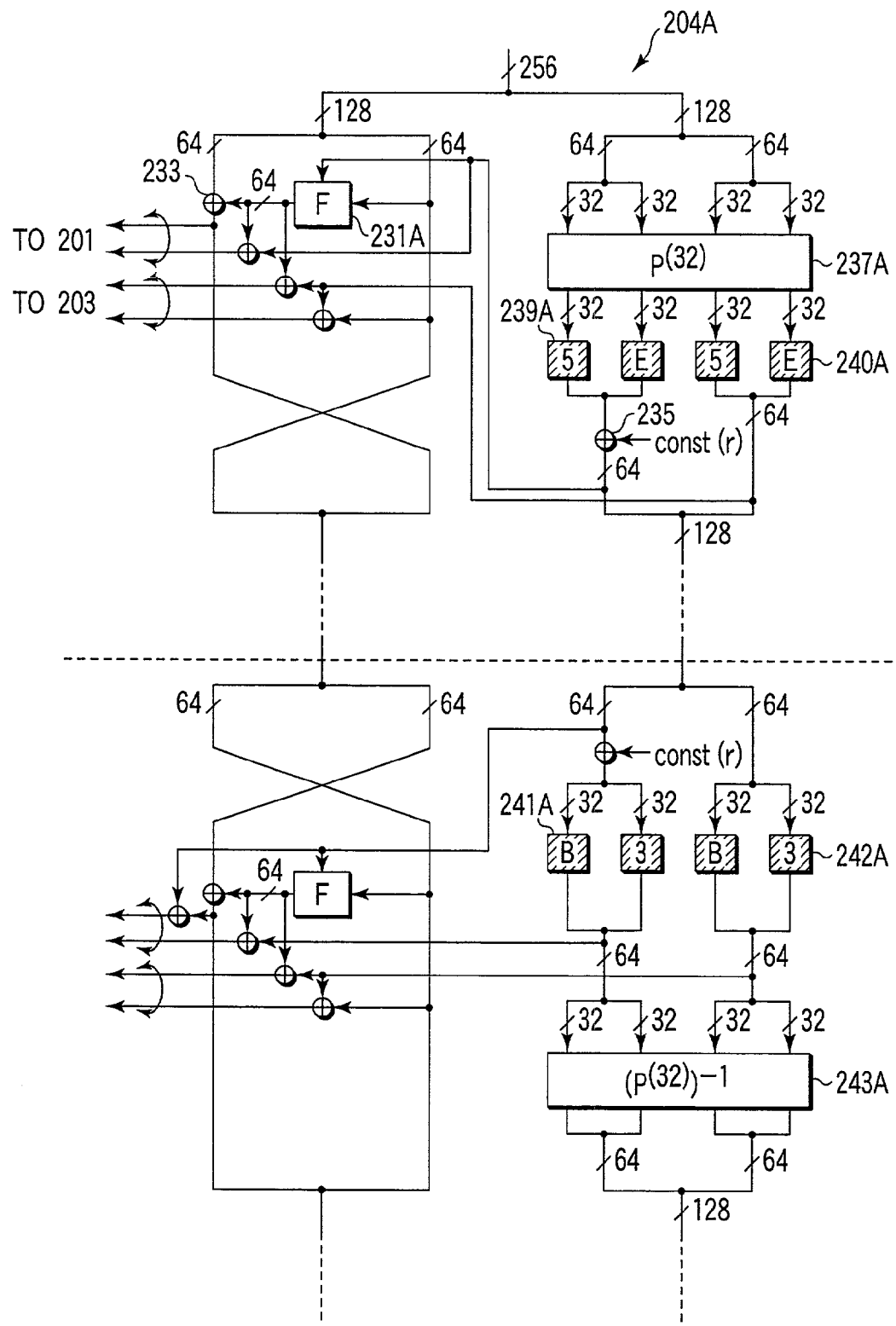
F I G. 36

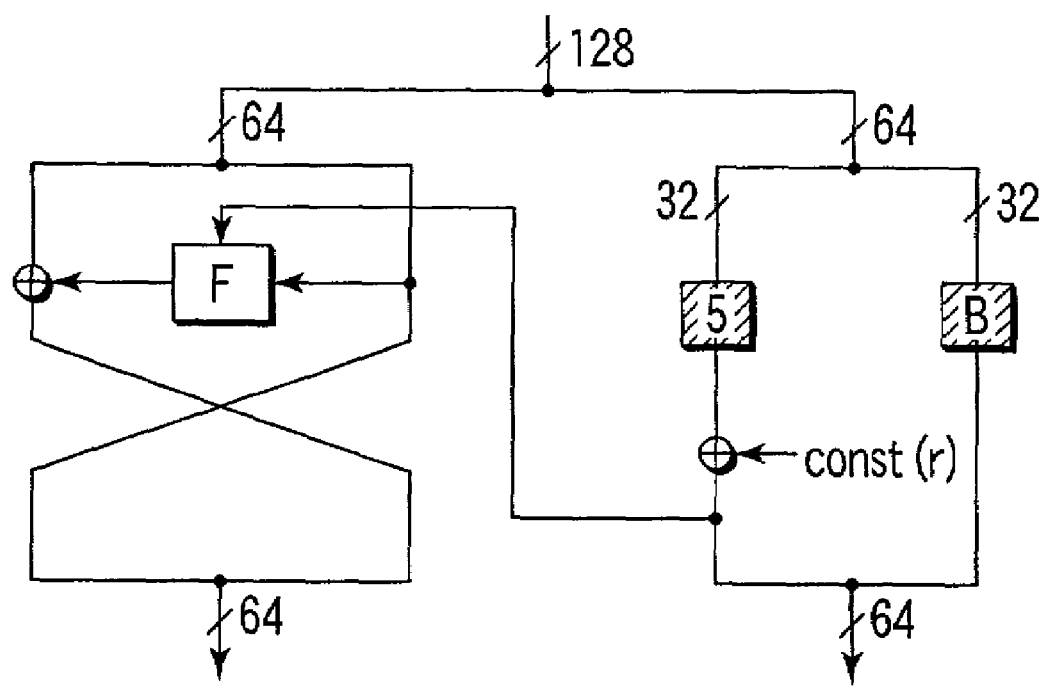
F I G. 44

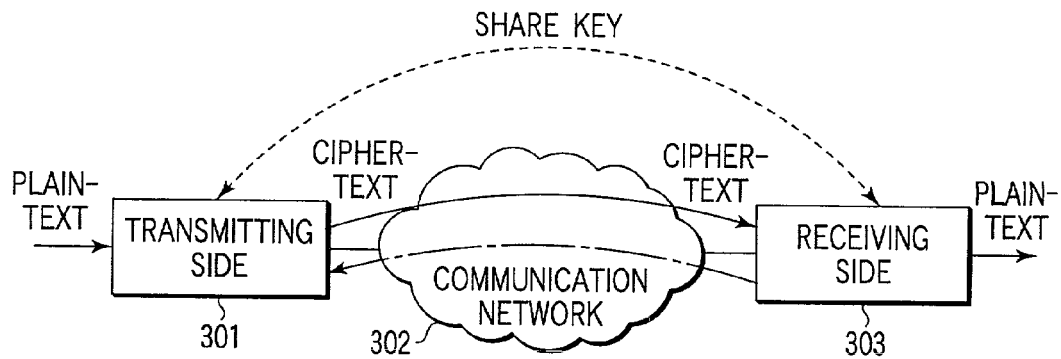
F I G. 45
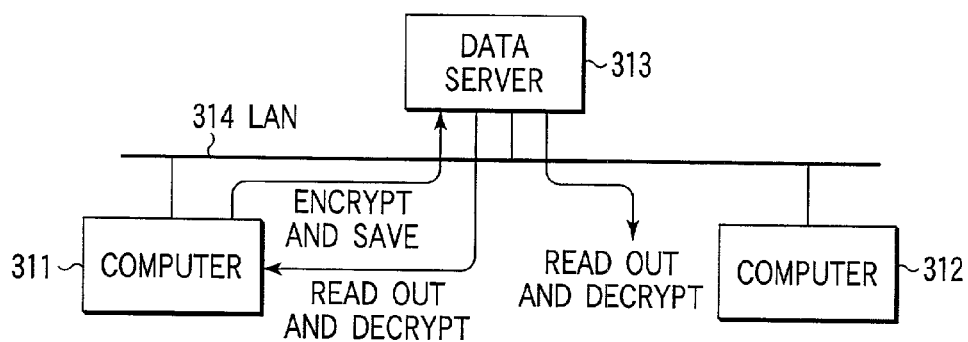
F I G. 46
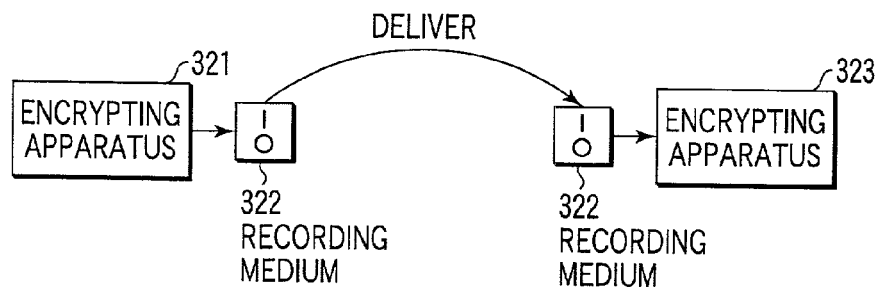
F I G. 47

ENCRYPTION APPARATUS, DECRYPTION APPARATUS, EXPANDED KEY GENERATING APPARATUS AND METHOD THEREFOR, AND RECORDING MEDIUM

CROSS-REFERENCE TO RELATED APPLICATIONS

This application is based upon and claims the benefit of priority from the prior Japanese Patent Application No. 2000-211686, filed Jul. 12, 2000, the entire contents of which are incorporated herein by reference.

BACKGROUND OF THE INVENTION

1. Field of the Invention

The present invention relates to an encryption apparatus and decryption apparatus which employ a plurality of expanded keys in reverse order for encryption and for decryption, and expanded key scheduling apparatus and method therefor, and recording medium storing a computer program therefor.

2. Description of the Related Art

The importance of an encryption technique becomes very high for the purpose of security control of computerized information, in particular, such as information on copyright or information on privacy. Such encryption technique is actually utilized in a variety of forms in a variety of fields.

There are various encryption systems, one of which is a common key encryption system. In the common key encryption system, decryption is carried out by employing a key (common key or secret key) that is identical to a key employed for encryption.

There are various common key encryption systems, one of which is a system employing an expanded key. This system generates a plurality of expanded keys whose total number of bits is greater than the number of bits that it has based on a common key.

In one of the expanded key scheduling systems, a round function (stage function) is acted with respect to a common key, and expanded key is generated based on its output value. Further, a round function is acted with the output value, and a next expanded key is generated based on its output value. Furthermore, a round function is acted with the output value. In this way, round functions are acted one after another, and expanded keys are sequentially generated. Such system is called a round system here.

A common key encryption system employing such expanded key scheduling system includes a common key block encryption system, for example. The common key block encryption system has a structure in which round functions are acted with block data with a predetermined bit length that is a processing unit one after another, with respect to a data randomizing section as well, thereby carrying out encryption or decryption. A typical basic structure of the above encryption system includes a SPN type and Feistel type or the like.

If a round system is employed for generating an expanded key, for example, as in block encryption, it is required to employ an expanded key in an order reversed from an order employed for encryption.

Now, problems with such system will be described here.

FIG. 48 shows an exemplary configuration of an expanded key scheduling section of a conventional encryption apparatus. The generating section comprises round processors $1001_1$ to $1001_n$ connected in series and expanded key converters $1005_1$ to $1005_n$ respectively connected to outputs of the expanded key processors $1005_1$ to $1005_n$.

At a data randomizing section, an expanded key (1) is required for an encryption process. Because of this, a round function (1) is acted with a common key, and its output value is obtained. Then, an expanded key conversion (1) is acted with the output value, and an expanded key (1) is obtained. A data randomizing section carries out an encryption process by employing this expanded key (1).

At the data randomizing section, an expanded key (2) is required for an encryption process. Because of this, a round function (2) is acted with an output value of the round function (1), and its output value is obtained. Then, an expanded key conversion (2) is acted with the output value, and an expanded key (2) is obtained. The data randomizing section carries out an encryption process by employing this expanded key (2).

Subsequently, an expanded key is generated by an expanded key scheduling section, and an encryption process is carried out by the data randomizing section in the same way.

Now, processing for decryption will be described here.

For decryption, it is required to employ an expanded key in an order reversed from that for encryption, i.e., in order from expanded key (n) to expanded key (1). However, in a conventional decryption apparatus having an expanded key scheduling section with its configuration similar to that shown in FIG. 48, expanded keys are generated in order from expanded key (1) to expanded key (n). Because of this, for example, prior to processing of the data randomizing section, there has been a need to generate all the expanded keys and store them in a memory.

However, there has been a problem that a device having only poor hardware environment such as IC card, for example, does not have a sufficient storage space for storing all the expanded keys required for decryption.

To overcome this problem, there is proposed an expanded key scheduling section shown in FIG. 49. The generating section comprises the round processors $1001_1$ to $1001_n$ connected in series, round processors $1021_n$ to $1021_2$ connected in series, the round processor $1021_n$ being connected to the round processor $1001_n$, the expanded key converters $1005_1$ to $1005_n$ respectively connected to outputs of the expanded key processors $1021_2$ to $1021_n$, and $1001_n$.

An expanded key scheduling process identical to that for encryption is temporarily carried out, and a round function is acted at the last stage, thereby obtaining an output value $R_n$. Then, the inverse function of each round function is acted with the output value $R_n$ in a stage direction reversed from that for encryption, and expanded keys are generated in order from expanded key (n) to expanded key (1), i.e., in an on-the-fly manner.

However, there has been a problem that a delay time occurs until decryption has been started because of unnecessary time for first generating the same expanded key $R_n$ as that for encryption.

As has been described above, in the conventional technique, expanded keys cannot be generated in reverse order, thus making it necessary to generate and store all the expanded keys prior to a decryption process. Because of this, there has been a problem that there is no sufficient storage space for storing all the expanded keys required for decryption in poor hardware environment such as IC card, for example.

In addition, in order to avoid this problem by generating keys in the on-the-fly manner, it is required to temporarily carry out an expanded key scheduling process identical to that for encryption, act a round function at the last stage, thereby obtaining an output value, and then, act the inverse function of each round function with the output value in the reverse round direction. However, in this case as well, there has been a problem that a delay time is unavoidable until decryption has been started.

BRIEF SUMMARY OF THE INVENTION

The present invention is directed to method and apparatus that substantially obviates one or more of the problems due to limitations and disadvantages of the related art.

It is an object of the present invention to provide an encryption apparatus, decryption apparatus, expanded key generation apparatus and method therefore, and recording medium which avoids or reduces a delay time in generating an expanded key and can generate the expanded key in an on-the-fly manner.

According to a first aspect of the present invention, an encryption apparatus based on a common key encryption system in which a plurality of expanded keys are used in a predetermined order in a data randomizing process for encryption and in a reversed order in a data randomizing process for decryption, the apparatus comprises:

a plurality of round processing circuits connected in series, the round processing circuit of a first stage receiving a common key and subjecting the common key to a round function to output a sub key and the round processing circuit of other stages receiving the sub key output from the round processing circuit of a previous stage and subjecting the sub key to a round function to output a sub key, the sub key output from the round processing circuit of a last stage being the common key; and a plurality of expanded key generating circuits configured to receive the sub keys output from at least a part of the round processing circuits and output expanded keys based on all or some bits of the received sub keys.

According to a second aspect of the present invention, a decryption apparatus based on a common key encryption system in which a plurality of expanded keys are used in a predetermined order in a data randomizing process for encryption and in a reversed order in a data randomizing process for decryption, the apparatus comprises:

a plurality of round processing circuits connected in series, the round processing circuit of a first stage receiving a common key and subjecting the common key to a round function to output a sub key and the round processing circuit of other stages receiving the sub key output from the round processing circuit of a previous stage and subjecting the sub key to a round function to output a sub key, the sub key output from the round processing circuit of a last stage being the common key; and a plurality of expanded key generating circuits configured to receive the sub keys output from at least a part of the round processing circuits and output expanded keys based on all or some bits of the received sub keys.

According to a third aspect of the present invention, an expanded key generation apparatus used for an encryption apparatus including a data randomizing process using a plurality of expanded keys in a predetermined order and a decryption apparatus including a data randomizing process using the plurality of expanded keys in a reversed order which are based on a common key encryption system, the apparatus comprises:

a plurality of round processing circuits connected in series, the round processing circuit of a first stage receiving a common key and subjecting the common key to a round function to output a sub key and the round processing circuit of other stages receiving the sub key output from the round processing circuit of a previous stage and subjecting the sub key to a round function to output a sub key, the sub key output from the round processing circuit of a last stage being the common key; and a plurality of expanded key generating circuits configured to receive the sub keys output from at least a part of the round processing circuits and output expanded keys based on all or some bits of the received sub keys.

According to a fourth aspect of the present invention, an expanded key generation method used for an encryption apparatus based on a common key encryption system in which a plurality of expanded keys are used in a predetermined order in a data randomizing process for encryption and in a reversed order in a data randomizing process for decryption, the method comprises:

subjecting a received common key to a round function to output a sub key by a round processing circuit of a first stage;

subjecting the sub key output from the round processing circuit of a previous stage to a round function to output a sub key by round processing circuit of other stages, the sub key output from the round processing circuit of a last stage being the common key; and generating expanded keys based on all or some bits of the sub keys from a plurality of round processing circuits.

According to a fifth aspect of the present invention, an expanded key generation method used for a decryption apparatus based on a common key encryption system in which a plurality of expanded keys are used in a predetermined order in a data randomizing process for encryption and in a reversed order in a data randomizing process for decryption, the method comprises:

subjecting a received common key to a round function to output a sub key by a round processing circuit of a first stage;

subjecting the sub key output from the round processing circuit of a previous stage to a round function to output a sub key by round processing circuit of other stages, the sub key output from the round processing circuit of a last stage being the common key; and generating expanded keys based on all or some bits of the sub keys from a plurality of round processing circuits.

According to a sixth aspect of the present invention, an article of manufacture comprising a computer usable medium having an expanded key generation program embodied therein, the expanded key generation program used for an encryption apparatus based on a common key encryption system in which a plurality of expanded keys are used in a predetermined order in a data randomizing process for encryption and in a reversed order in a data randomizing process for decryption, the program comprises:

computer readable program code means for causing a computer to subject a common key to a round function to output a sub key of a first stage;

computer readable program code means for causing a computer to subject the sub key of a previous stage to a round function to output a sub key of other stages, the sub key of a last stage being the common key; and computer readable program code means for causing a computer to generate expanded keys based on all or some bits of the sub keys.

According to a seventh aspect of the present invention, an article of manufacture comprising a computer usable medium having an expanded key generation program embodied therein, the expanded key generation program used for a decryption apparatus based on a common key encryption system in which a plurality of expanded keys are used in a predetermined order in a data randomizing process for encryption and in a reversed order in a data randomizing process for decryption, the program comprises:

computer readable program code means for causing a computer to subject a common key to a round function to output a sub key of a first stage;

computer readable program code means for causing a computer to subject the sub key of a previous stage to a round function to output a sub key of other stages, the sub key of a last stage being the common key; and computer readable program code means for causing a computer to generate expanded keys based on all or some bits of the sub keys.

BRIEF DESCRIPTION OF THE SEVERAL VIEWS OF THE DRAWING

FIG. 1 is a view showing an encryption apparatus according to one embodiment of the present invention;

FIG. 6 is a view illustrating another example of a series of round functions of a round trip/loop composite type;

FIG. 7 is a view illustrating still another example of a series of round functions of a round trip/loop composite type;

FIG. 8 is a view illustrating a further example of a series of round functions of a round trip/loop composite type;

FIG. 14 is a view showing still another example of connection between expanded keys and randomizing sections in FIGS. 10 and 12;

FIG. 15 is a view showing a further example of connection between expanded keys and randomizing sections in FIGS. 10 and 12;

FIG. 19 is a view showing an expanded key scheduling section according to the embodiment;

FIG. 20 is a view showing one example of a round processing section according to the embodiment;

FIG. 21 is a view showing another example of a round processing section according to the embodiment;

FIG. 22 is a view showing a nonlinear function unit of the round processing section shown in FIG. 21;

FIG. 23 is a view showing a round processing section having an inverse function of the round processing shown in FIG. 21;

FIG. 25 is a view showing a first unit DU shown in FIG. 24;

FIG. 26 is a view showing a second unit DD shown in FIG. 24;

FIG. 27 is a view showing a third unit DD (woMDSH) shown in FIG. 24;

FIG. 30 is a view illustrating a nonlinear function unit shown in FIGS. 28 and 29;

FIG. 31 is a view illustrating one example of a unit performing an exclusive OR operation shown in FIGS. 28 and 29;

FIG. 32 is a view illustrating another example of a unit performing an exclusive OR operation shown in FIGS. 28 and 29;

FIGS. 34A and 34B are views illustrating a unit performing multiplication on a Galois field shown in FIGS. 28 and 29;

FIG. 35 is a view showing connection patterns performing multiplication on a Galois field;

FIG. 36 is a view showing another example of an expanded key scheduling section of the encryption apparatus according to the embodiment;

FIG. 44 is a view illustrating an example of a dummy stage used in FIG. 41;

FIG. 45 is a view showing one example of a system utilizing the encryption system according to the embodiment;

FIG. 46 is a view showing another example of a system utilizing the encryption system according to the embodiment;

FIG. 47 is a view showing still another example of a system utilizing an encryption system according to the embodiment;

DETAILED DESCRIPTION OF THE INVENTION

Figure 2:
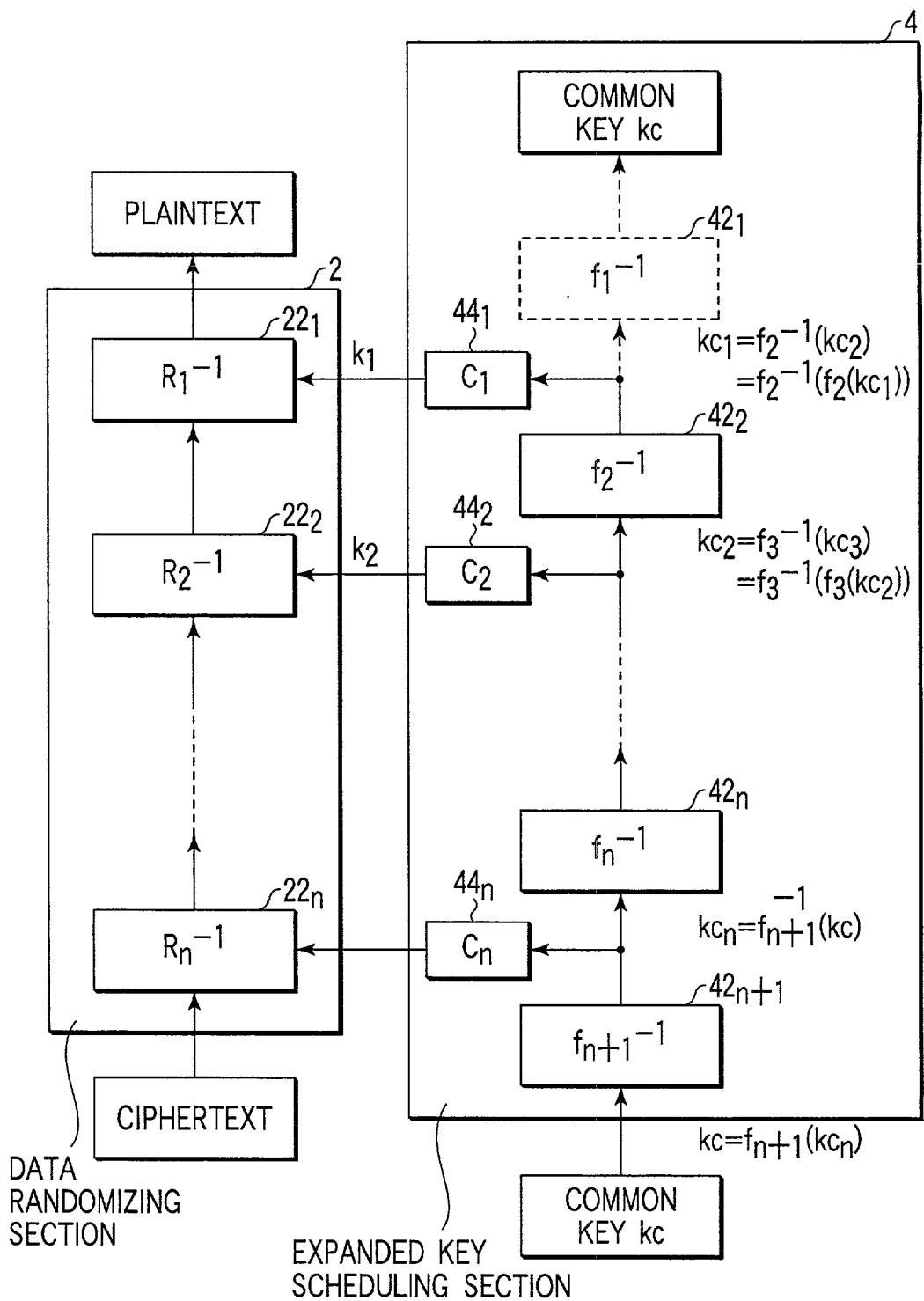
FIG. 2 is a view showing a decryption apparatus according to the embodiment.

An embodiment of an encryption apparatus and decryption apparatus, expanded key scheduling apparatus and method therefor, and recording medium storing a computer program therefor according to the present invention will now be described with reference to the accompanying drawings.

The present invention is applicable to all of the common key encryption systems employing expanded keys in a reversed order between for encryption and for decryption. Hereinafter, the present invention will be described by way of showing an example of a common key block encryption system in which a data randomizing process employing an expanded key is carried out sequentially with respect to block data of a predetermined bit length.

In the figures shown below, although there is shown data subjected to be encrypted (for the purpose of explanation by paying attention to the data) as a plaintext, of course, the data subjected to be encrypted may be one data that has been already encrypted by the same or another encryption system. This encryption system can be achieved by hardware or software. An exemplary configuration shown below is achieved as a functional block diagram of an encryption apparatus (decryption apparatus) or is achieved as a functional module diagram or flow chart of an encryption algorithm (decryption algorithm).

FIG. 1 shows an exemplary configuration of an encryption apparatus according to one embodiment of the present invention. This encryption apparatus comprises a data randomizing section 1 and an expanded key scheduling section 3.

The expanded key scheduling section 3 comprises a plurality of round processing sections $31_1$ to $31_n$ (occasionally comprises $31_{n+1}$).

A round processing section $31_1$ of the first stage acts a round function $f_1$ with a common key kc, and outputs a first sub key $kc_1=f_1(kc)$.

A round processing section $31_2$ of a second stage acts a round function $f_2$ with the sub key $kc_1$ output from the round processing section $31_1$ of the previous stage (shown herein as the first stage), and outputs a sub key $kc_2=f_2(kc_1)=f_2(f_1(kc))$.

This is applied to round processing sections from a third stage to (n−1) stage (not shown).

A round processing section $31_n$ acts a round function $f_n$ of n-th stage with a sub key $kc_{n-1}$ output from the round processing section $31_{n-1}$ (shown herein as (n−1)-th stage), and outputs a sub key $kc_n=f_n(kc_{n-1})=f_n(f_{n-1}(\ldots f_2(f_1(kc))\ldots))$.

In the present embodiment, a round processing section $31_{n+1}$ at the (n+1)-th stage acts the round function $f_{n+1}$ with the sub key $kc_n$ output from the n-th round processing section $31_n$ so that the thus obtained output value $kc_n=f_{n+1}(kc_{n-1})=f_{n+1}(f_n(f_{n-1}(\ldots f_2(f_1(kc))\ldots)))$ is equal to the common key "kc".

An inverse function $f_{n+1}^{-1}$ of the round function $f_{n+1}$ of the (n+1)-th stage is obtained as a round function of the round processing section at the first stage of the expanded key scheduling section in the decryption apparatus.

The expanded key scheduling section 3 in the encryption apparatus may or may not comprise the round processing section $31_{n+1}$ (the last stage) of the round function $f_{n+1}$. If it is included, the expanded key scheduling section in the encryption apparatus and the expanded key scheduling section in the decryption apparatus have the same configuration. Therefore, the same expanded key scheduling section can be used for the encryption apparatus and decryption apparatus. This leads to an advantage that a single device for encryption/decryption purpose can be small sized.

The expanded key scheduling section 3 comprises a plurality of expanded key converting sections $33_1$ to $33_n$.

The expanded key converting section $33_1$ of the first stage acts the expanded key converting function $C_1$ with all or some bit/bits of the sub key $kc_1$ of the round processing section $31_1$ of the first stage, and generates an expanded key $k_1$ of the first stage.

The expanded key converting section $33_2$ of the second stage acts the expanded key converting function $C_2$ with all or some bit/bits of the sub key $kc_2$ of the round processing section $31_2$ of the first stage, and generates an expanded key $k_2$ of the second stage.

This is applied to the expanded key converting sections from a third stage to the (n−1)-th stage (not shown).

The expanded key converting section $33_n$ of the n-th stage acts the expanded key conversion function $C_n$ with all or some bit/bits of the sub key $kc_n$ of the round processing section $31_n$ of the n-th stage, and generates an expanded key $k_n$ of the n-th stage.

The data randomizing section 1 comprises a plurality of randomizing processing sections $11_1$ to $11_n$ (using a round function, for example) connected in series.

The randomizing processing section $11_1$ of the first stage receives block data (plaintext) subjected to be encrypted, and carries out randomizing processing $R_1$ by employing the expanded key $k_1$.

The randomizing processing section $11_2$ of the second stage receives block data output from the randomizing processing section $11_1$ of the first stage, and carries out randomizing processing $R_2$ by using the expanded key $k_2$.

This is applied to the randomizing processing sections from the third stage to the (n−1)-th stage (not shown).

The randomizing processing section $11_n$ of the n-th stage receives block data output from the randomizing processing section of the (n−1) stage, and carries out randomizing processing $R_n$ by employing the expanded key $k_n$. An output of the randomizing processing section $11_n$ of the n-th stage is obtained as a ciphertext.

The round functions employed for a plurality of randomizing processes may be different from each other or may be identical to each other. Otherwise, the identical and different functions may coexist. If a plurality of round functions are differentiated from each other, there is provided a method in which the identical functions are basically employed, depending on different constants according to stages as well as a method for differentiating functions.

Although a plurality of round functions may be linear functions or arbitrary functions, it is preferable that at least one of these functions is a nonlinear function. Two or more round functions or all the round functions may be nonlinear functions.

The round functions are achieved by a variety of configurations and methods such as a method using a conversion table, a matrix operation or any other calculation method, or using hardware.

This is applied to a plurality of expanded key conversion functions.

As a modified example of the round processing sections $33_1$ to $33_n$ of each stage, an input sub key or some bit/bits of this key can be output intact as an expanded key (alternatively, a sub key is directly linked with a data randomizing section 1 (or switching circuit 15 described later)).

A data length of block data may be identical to or different from that of a common key "kc". A data length of an expanded key may be identical to or different from that of the block data. A data length of a sub key may be identical to or different from that of the expanded key.

FIG. 2 shows an exemplary configuration of a decryption apparatus according to the embodiment of the present invention. This decryption apparatus comprises a data randomizing section 2 and an expanded key scheduling section 4. The decryption apparatus shown in FIG. 2 has a function for inversely converting the encryption apparatus shown in FIG. 1.

The expanded key scheduling section 4 comprises a plurality of round processing sections $42_{n+1 \text{ to } 422}$ (occasionally comprises $42_1$), wherein the inverse function of each of a plurality of round functions at the expanded key scheduling section 2 in the encryption apparatus shown in FIG. 1 is acted in a reverse order.

The round processing section $42_{n+1}$ acts a round function $f_{n+1}^{-1}$ with a common key $kc = f_{n+1}(kc_n) = f_{n+1}(f_n(f_{n-1}( \ldots f_2(f_1(kc)) \ldots )))$, and outputs a sub key $kc_n = f_{n+1}^{-1}(kc) = f_{n+1}^{-1}(f_{n+1}(f_n(f_{n-1}( \ldots f_2(f_1(kc)) )))) = f_n(f_{n-1}(\ldots f_2(f_1(kc)) \ldots ))$.

The round processing section $42_n$ acts a round function $f^{-1}$ with a sub key $kc_n$ output from the round processing section $42_{n+1}$ of the previous stage, and outputs $kc_{n-1} = f_n^{-1}( \ldots f_2(f_1(kc)) \ldots )$.

This is applied to the round processing sections $42_{n-1}$ to $42_3$ (not shown).

The round processing section $42_2$ acts a round function $f_{2-1}$ with a sub key $kc_2$ output from the round processing section $42_3$ of the previous stage, and outputs $kc_1 = f_1(kc)$.

The round processing section $42_1$ acts round function $f_1^{-1}$ with the sub key $kc_1$ output from the round processing section $42_2$ of the previous stage, whereby the thus obtained output value is equal to the common key "kc".

The inverse function $f_1$ of the round function $f_1^{-1}$ is obtained as a round function of a round function at the first stage of the expanded key scheduling section in the encryption apparatus. In the exemplary configuration shown in FIG. 2, in this decryption apparatus, the expanded key scheduling section 4 may or may not comprise a round processing section $42_1$ of the round function $f_1^{-1}$. If it is included, the expanded key scheduling section in the encryption apparatus and the expanded key scheduling section in the decryption apparatus have the same configuration. Therefore, the same expanded key scheduling section can be used for the encryption apparatus and decryption apparatus. This leads to an advantage that a single device for encryption/decryption purpose can be small sized.

The expanded key scheduling section 4 comprises a plurality of expanded key converting sections $44_1$ to $44_n$. These sections carry out the same processing as the corresponding expanded key converting sections $33_1$ to $33_n$ of the encryption apparatus shown in FIG. 1.

The data randomizing section 2 comprises a plurality of randomizing processing sections $22_1$ to $22_n$ (based on the round function, for example) connected in series.

The randomizing processing section $22_n$ of the n-th stage receives block data (ciphertext) subjected to be decrypted, and carries out randomizing processing $R_n^{-1}$ that is inverse conversion of randomizing processing $R_n$ of the encryption apparatus by employing the expanded key $k_n$.

Similarly, the randomizing processing sections $22_{n-1}$ to $22_2$ from the (n-1)-th stage to the second stage sequentially receive block data output from the randomizing processing sections of the previous stage, and carry out randomizing processing $R_{n-1}^{-1}, \ldots R_2^{-1}$ by employing the expanded keys $k_{n-1}, \ldots k_2$.

The randomizing processing section $22_1$ of the first stage receives block data output from the randomizing processing section $22_2$ of the second stage, and carries out randomizing processing $R_1^{-1}$ that is inverse conversion of randomizing processing $R_1$ of the encryption apparatus by employing the expanded key $k_1$. An output of the randomizing processing $22_1$ of the first stage is obtained as decryption result (block data (plaintext)).

That is, as shown in FIG. 2, for decryption, expanded keys are generated in a reversed order from that for encryption, and the expanded keys can be generated one after another. Processing is advanced from the first stage to the n-th stage in encryption while processing is advanced from the n-th stage to the first stage in decryption.

As has been described above, with respect to a series of round functions for encryption (however, the last stage may not be provided) and a series of round function for decryption which is a series of inverse functions of the round functions for encryption (however, the first stage (0-th stage before the 1st stage) may not be provided), a series of round functions is set so that a value corresponding to an output at the last stage for encryption coincides with an original common key. In this manner, in both of encryption and decryption, it is possible to generate an expanded key from a common key in an on-the-fly manner without consumption of the conventional unnecessary delay time or storage capacity.

Now, a description will be given with respect to a series of round functions which is employed in a plurality of round processing sections of the expanded key scheduling section in the encryption apparatus shown in FIG. 1 and in the decryption apparatus shown in FIG. 2. A series of round functions in the encryption apparatus has a relationship in inverse function from a series of round functions in the decryption apparatus. Thus, when one is determined, and the other is determined. Here, a description will be given by way of showing an example of the decryption apparatus.

With respect of a series of round functions $f_1, f_2, \ldots f_{n+1}$, the contents of a series of round functions or the contents of round functions in each order can be properly set in a range that meets conditions in which the series of round functions inputs a common key as a whole, and outputs the same value as the common key, and a plurality of variations are possible. Hereinafter, some of the variations in a series of round functions will be described by way of example.

Round Trip Configuration

Here, the number of stages in series of round functions is defined as a 2r stage (as described previously, a round function of the 2r-th stage may not be provided).

One method configuring a series of round functions is configured so as to meet a relationship that, with respect to all "i" meeting $0 \leq i \leq r$, a (r+1)-th stage function is an inverse function of a (r−i+1)-th stage function.

For example, assuming that a series of round functions is defined as $f_1, f_2, f_3, f_4, f_5, f_6, f_7,$ and $f_8$, $f_1$ to $f_4$ are defined as arbitrary round functions, when $f_5 = f_4^{-1}$, $f_6 = f_3^{-1}$, $f_7 = f_2^{-1}$, and $f_8 = f_1^{-1}$, a series of orders $f_1, f_2, f_3, f_4, f_4^{-1}, f_3^{-1}, f_2^{-1},$ and $f_1^{-1}$ is obtained. That is, when a common key is input, $f_1, f_2, f_3, f_4, f_4^{-1}, f_3^{-1}, f_2^{-1},$ and $f_1^{-1}$ are acted sequentially, whereby an output of the last stage coincides with the common stage.

Such configuration is referred to as a round trip configuration. The details of this configuration is conceptually shown in FIG. 3.

If the round trip configuration is employed, a series of round functions in the encryption apparatus is identical to a series of round functions in the decryption apparatus.

In the above example, assuming that round functions of the eight stages in the decryption apparatus are $f_1$, $f_2$, $f_3$, $f_4$, $f_4^{-1}$, $f_3^{-1}$, $f_2^{-1}$, and $f_1^{-1}$, the round functions of the eight stages in the decryption apparatus becomes inverse functions of these functions, and the result is $(f_1^{-1})^{-1}$, $(f_2^{-1})^{-1}$, $(f_3^{-1})^{-1}$, $(f_4^{-1})^{-1}$, $(f_4)^{-1}$, $(f_3)^{-1}$, $(f_2)^{-1}$, and $(f_1)^{-1}$. Therefore, the result is $f_1$, $f_2$, $f_3$, $f_4$, $f_4^{-1}$, $f_3^{-1}$, $f_2^{-1}$, and $f_1^{-1}$, and it is found that both of them coincide with each other.

In the encryption apparatus as well, although a round function of the last stage ($f_1^{-1}$ in the above example) may not be provided, in any case, the round function of the last stage is provided, thereby providing the same configuration. Thus, in the apparatus provided with both functions, an encryption function and a decryption function, one expanded key scheduling section is used for encryption and for decryption, thereby making it possible to reduce the apparatus in size.

In this configuration, the round functions in the first half in series of round functions may be different from each other, may be identical to each other, and the different and identical functions may coexist.

For example, if the round functions in the first half in series of round functions are identical to each other, assuming that eight stages are provided, a series of $f_1$, $f_1$, $f_1$, $f_1$, $f_1^{-1}$, $f_1^{-1}$, $f_1^{-1}$, and $f_1^{-1}$ is provided in any of the decryption and encryption sides.

In the meantime, if the round trip configuration is employed, the sub keys of the corresponding section that has a relationship of inverse function in series of round functions are identical to each other. Therefore, if the same expanded key conversion function is acted with the same sub key, the same expanded key is generated. In order to avoid this situation, there may be employed different expanded key conversion functions of two expanded key converting sections with respect to the corresponding section having a relationship in inverse function in series of round functions.

For example, assuming that a series of round functions at the eight stages is $f_1$, $f_2$, $f_3$, $f_4$, $f_4^{-1}$, $f_3^{-1}$, $f_2^{-1}$, and $f_1^{-1}$, an expanded key conversion function employing an output of $f_1$ is $C_1$, . . . , and an expanded key conversion function employing an output of $f_2^{-1}$ is $C_7$, the expanded key conversion function $C_1$ and the expanded key conversion function $C_7$ may be differentiated from each other. This is applied to $C_2$ and $C_6$; and $C_3$ and $C_5$.

Loop Configuration

In the round trip configuration, although the last half of a series of round functions has been defined as an inverse function of the first half, there can be provided a configuration in which no portion corresponding to the round trip configuration is provided as a partial series from among series of round functions.

Such configuration is referred to as a loop configuration. The details of the loop configuration is conceptually shown in FIG. 4.

In the round trip configuration, although the number of stages in series of round functions is defined as even stages, the number of stages in series of round functions may be even number stages or odd number stages in the loop configuration.

For example, if a series of round functions is defined as eight stages, by defining a common key as an input, $f_1$, $f_2$, $f_3$, $f_4$, $f_5$, $f_6$, $f_7$, and $f_8$ are acted one after another, whereby an output of the last stage coincides with a common key. In this case, these inverse functions are $f_8^{-1}$, $f_7^{-1}$, $f_6^{-1}$, $f_5^{-1}$, $f_4^{-1}$, $f_3^{-1}$, $f_2^{-1}$, and $f_1^{-1}$. When a common key is input, the output of the last stage coincides with the common key.

For example, if all the round functions in the first half in series of round functions are identical to each other, assuming that eight stages are provided, a series of $f_1$, $f_1$, $f_1$, $f_1$, $f_1$, $f_1$, $f_1$, and $f_1$ is provided on the encryption side.

A series of $f_1^{-1}$, $f_1^{-1}$, $f_1^{-1}$, $f_1^{-1}$, $f_1^{-1}$, $f_1^{-1}$, $f_1^{-1}$, and $f_1^{-1}$ is provided on the decryption side.

A variety of functions that meet such conditions include sift operation, matrix operation, Galois field operation or the like.

Round Trip/Loop Composite Configuration

As a series of round function, there can be provided a configuration in which a portion corresponding to the round trip configuration and a portion corresponding to the loop configuration are provided in combination as its partial series.

Figure 3:
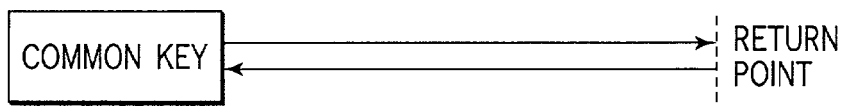
FIG. 3 is a view illustrating a series of round functions of a round trip type.
Figure 4:
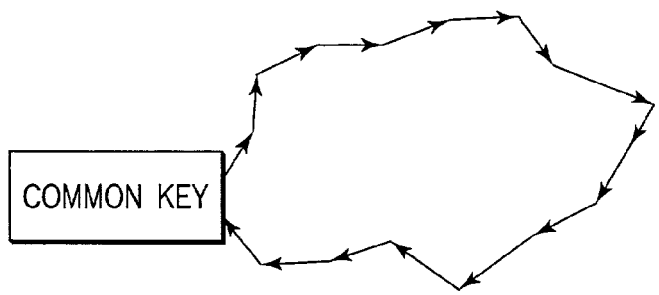
FIG. 4 is a view illustrating a series of round functions of a loop type.

Hereinafter, a round trip configuration portion is shown by the expression method shown in FIG. 3, the loop configuration portion is shown by the expression method shown in FIG. 4, and some variations are exemplified in FIG. 5 to FIG. 9.

Figure 5:
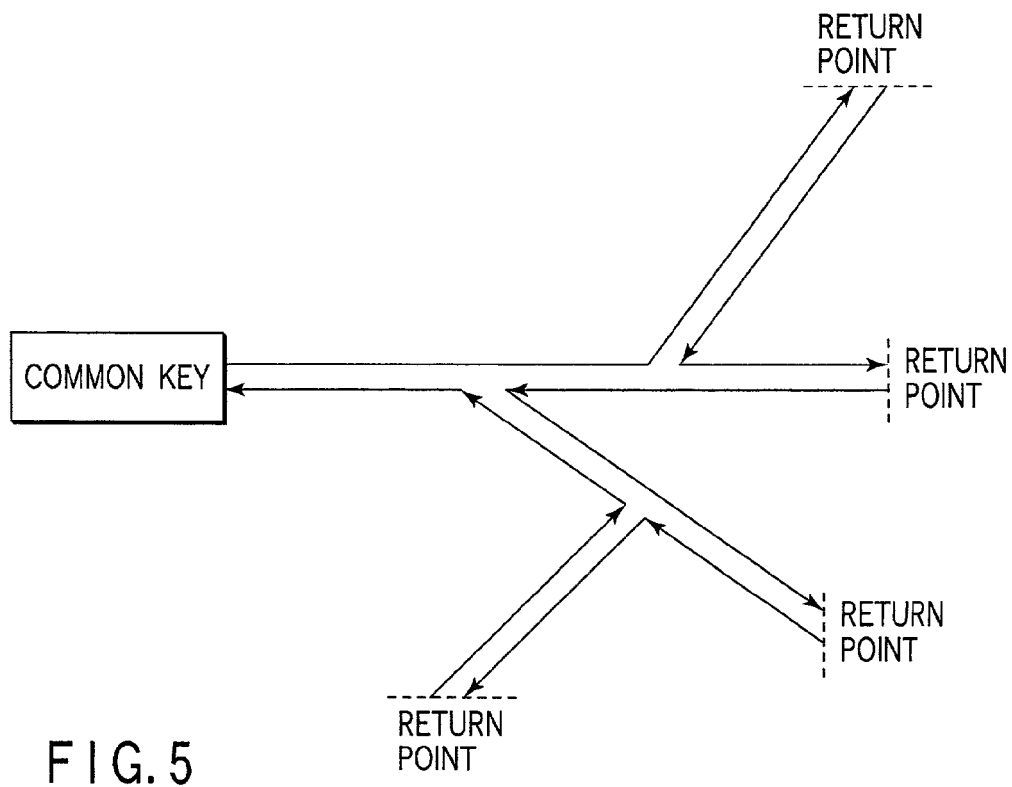
FIG. 5 is a view illustrating one example of a series of round functions of a round trip/loop composite type.

An example of FIG. 5 shows a structure such that a round trip configuration portion is included in the middle of a round trip portion. A series of round functions in FIG. 5 is exemplified as: $a_1 \to a_2 \to a_3 \to b_1 \to b_2 \to b_2^{-1} \to b_1^{-1} \to a_4 \to a_5 \to a_6 \to a_6^{-1} \to a_5^{-1} \to a_4^{-1} \to a_3^{-1} \to c_1 \to c_2 \to c_2^{-1} \to d_1 \to d_1^{-1} \to c_1^{-1} \to a_2^{-1} \to a_1^{-1}$.

In this example, a round trip configuration of $a_1 \to a_2 \to a_3 \to a_4 \to a_5 \to a_6 \to a_6^{-1} \to a_5^{-1} \to a_4^{-1} \to a_3^{-1} \to a_2^{-1} \to a_1^{-1}$ includes a round trip configuration of $b_1 \to b_2 \to b_2^{-1} \to b_1^{-1}$ and a round trip configuration of $c_1 \to c_2 \to c_2^{-1} \to c_1^{-1}$. Further, a round trip configuration of $c_1 \to c_2 \to c_2^{-1} \to c_1^{-1}$ includes a round trip of $d_1 \to d_1^{-1}$.

An example of FIG. 6 shows a structure such that a loop configuration portion is included in the middle of the loop configuration portion. A series of round functions in FIG. 6 is exemplified as: $s_1 \to s_2 \to s_3 \to s_4 \to t_1 \to t_2 \to t_3 \to s_5 \to s_6 \to s_7 \to s_8$.

In this example, a loop configuration of $s_1 \to s_2 \to s_3 \to s_4 \to s_5 \to s_6 \to s_7 \to s_8$ includes a loop configuration of $t_1 \to t_2 \to t_3$.

An example of FIG. 7 shows a structure such that a round trip configuration portion is included in the middle of a loop configuration portion. A series of round functions in FIG. 7 is exemplified as: $s_1 \to s_2 \to s_3 \to s_4 \to s_5 \to a_1 \to a_2 \to a_3 \to a_3^{-1} \to a_2^{-1} \to a_1^{-1} \to s_6 \to s_7 \to s_8 \to s_9$.

In this example, a loop configuration of $s_1 \to s_2 \to s_3 \to s_4 \to s_5 \to s_6 \to s_7 \to s_8 \to s_9$ includes a round trip configuration of $a_1 \to a_2 \to a_3 \to a_3^{-1} \to a_2^{-1} \to a_1^{-1}$.

An example of FIG. 8 shows a structure such that a loop configuration portion is included in the middle of a round trip configuration portion. A series of round functions in FIG. 8 is exemplified as: $a_1 \to a_2 \to a_3 \to a_4 \to a_5 \to a_6 \to s_1 \to s_2 \to s_3 \to s_4 \to s_6^{-1} \to a_5^{-1} \to a_4^{-1} \to a_3^{-1} \to a_2^{-1} \to a_1^{-1}$.

In this case, a round trip configuration of $a_1 \to a_2 \to a_3 \to a_4 \to a_5 \to a_6 \to a_6^{-1} \to a_5^{-1} \to a_4^{-1} \to a_3^{-1} \to a_2^{-1} \to a_1^{-1}$ includes a loop configuration of $s_1 \to s_2 \to s_3 \to s_4$.

Figure 9:
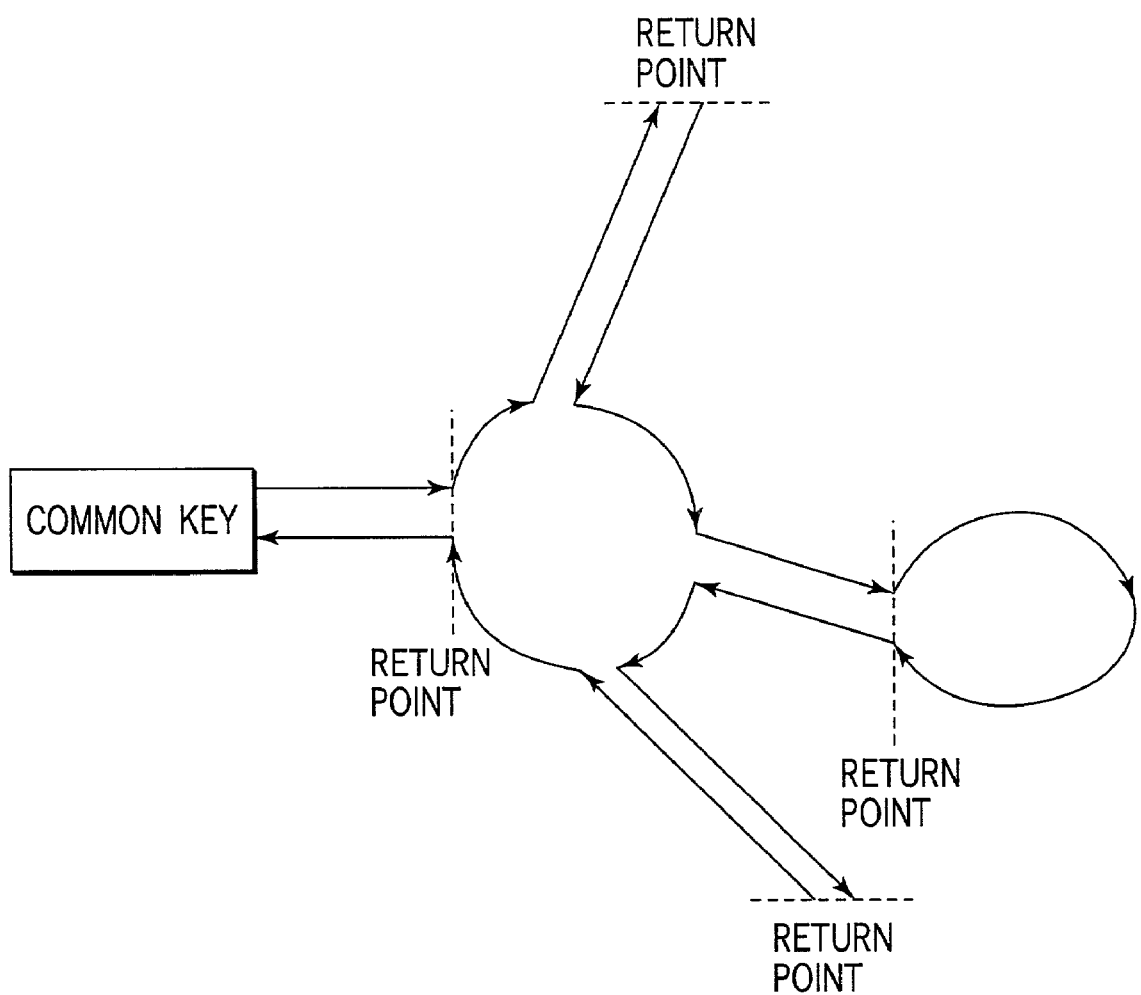
FIG. 9 is a view illustrating a still further example of a series of round functions of a round trip/loop composite type.

An example of FIG. 9 has four round trip configuration portions and two loop portions.

Of course, in addition to these configurations, there can be provided a plurality of variations such as a combination of a round trip configuration portion and a loop configuration portion or employment of a hierarchical structure.

Although exemplary configurations of FIG. 1 and FIG. 2 generate a plurality of expanded keys in number required for the data randomizing section, there can comprise the number of stages for round functions capable of generating expanded keys in number that exceeds the number required for the data randomizing section, wherein a part of the generated expanded keys is used by the data randomizing section.

Figure 10:
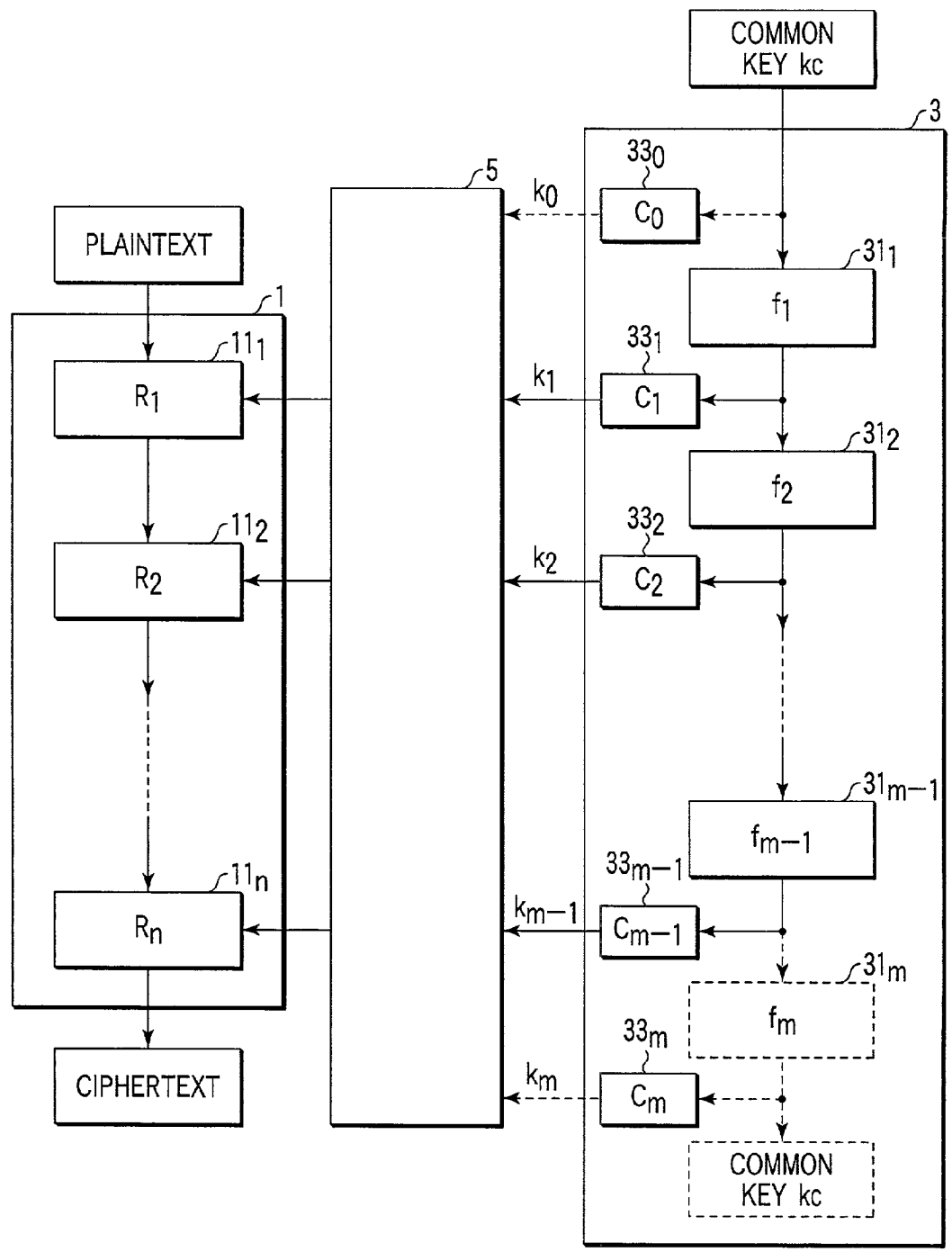
FIG. 10 is a view showing another encryption apparatus according to the embodiment.
Figure 11:
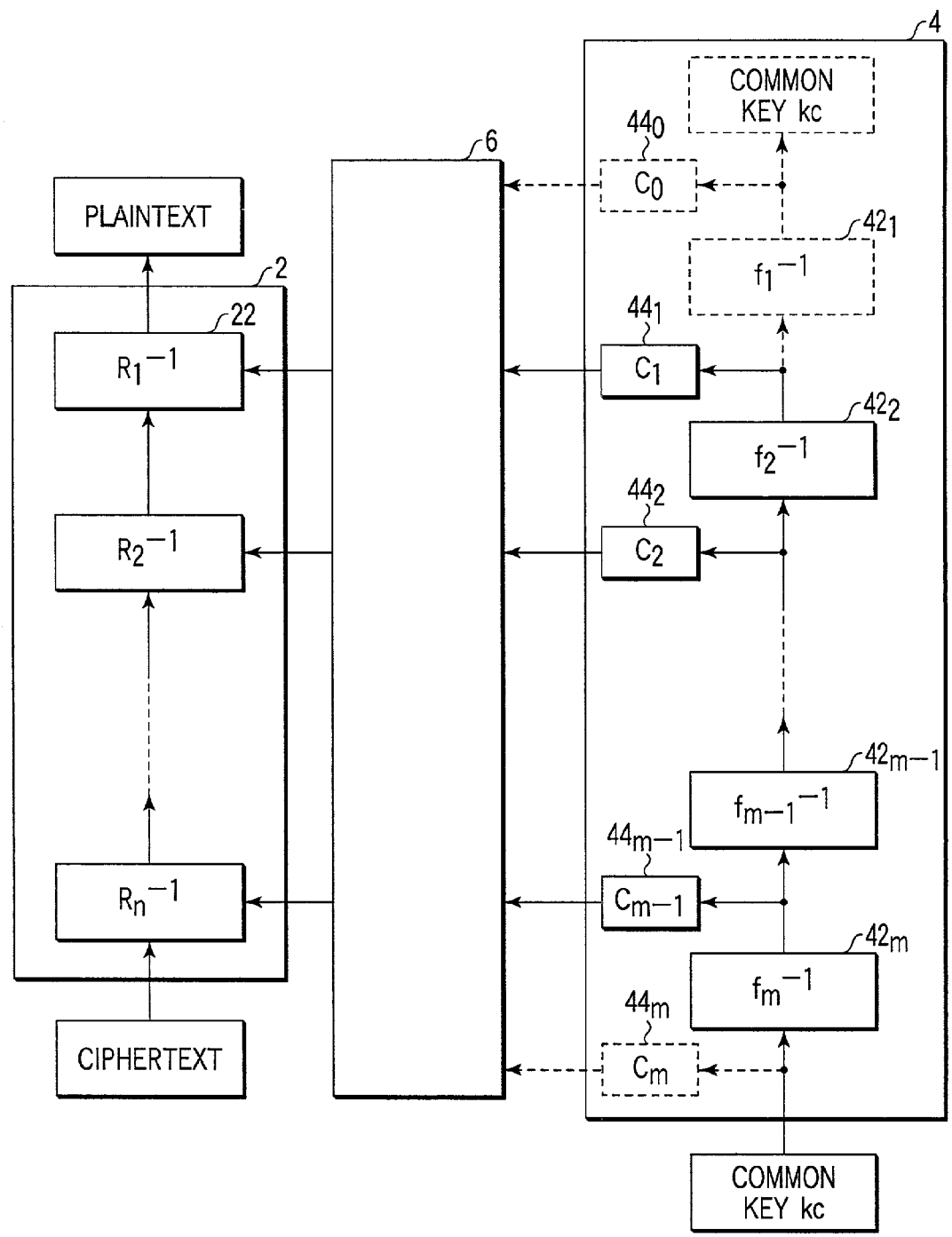
FIG. 11 is a view showing another decryption apparatus according to the embodiment.

Exemplary configurations corresponding to the encryption/decryption apparatus shown in FIG. 1 and FIG. 2 are shown, respectively, in FIG. 10 and FIG. 11.

Now, the differences between FIGS. 1 and 2 and FIGS. 10 and 11 will be described here. Of course, a series of round functions may employ the above described round trip configuration or the like.

Reference numeral 5 in FIG. 10 and reference numeral 6 in FIG. 11 are portions that indicates a connection relationship between expanded keys $k_i$ and randomizing processes $R_j$, some typical examples of which are shown in FIG. 12 to FIG. 15. In the present embodiment, the connection relationship in reference numeral 5 of FIG. 10 is identical to that in reference numeral 6 of FIG. 11.

Both or either one of the common key that is input to a round function of the first stage and the common key that is output from a round function of the last stage may be utilized to generate an expanded key as a sub key. In the latter case, an output of the round function of the last stage may be employed, and a common key may be stored and employed.

The number of expanded keys capable of being generated is configured to be larger than the number of expanded keys required for a randomizing process, and the expanded key $k_1$ is properly associated with the randomizing process $R_j$. There are a method capable of using the same expanded key for a plurality of randomizing processes and a method capable of exclusively using one expanded key with respect to one randomizing process.

An unused expanded key may not be generated. In this case, the corresponding expanded key converting section may not be provided.

A configuration in which only part of the expanded keys that are capable of being generated is used for data randomizing is effective in view of safety against attack.

Hereinafter, a plurality of variations will be described.

First, if the number of stages in randomizing processing of the data randomizing section is defined as "n", and the number of expanded keys capable of being generated (assuming that an expanded key converting section is provided) is "m" (m>n), in a configuration that does not permit duplicate use of expanded keys, there can be basically provided all combinations in which "n" expanded keys are arbitrarily selected from among "m" expanded keys. Here, expanded keys are assumed to be used in order to be generated.

In a configuration that permits duplicate use of expanded keys, $n^m$ combinations can be basically provided.

Any expanded key is selected randomly or in accordance with a predetermined standard.

In a specific attack called SQUARE attack, full search is carried out for a conventional encryption system and for partial bits of the expanded key of the first stage (or the expanded keys of some continuous stages from the start) or the last stage (or the expanded keys of some continuous stages to the last stage). In this case, if the expanded keys of the first and last stages are identical to each other, a search space is reduced, and there is a higher possibility that decryption is effected.

With respect to an expanded key obtained by the expanded key converting section at the first stage (hereinafter, referred to as an expanded key at the first stage) and an expanded key obtained by the expanded key converting section at the last stage (hereinafter, referred to as an expanded key at the last stage), only one of them may be used for data randomizing (there are two methods, i.e., a method of using one of them for data randomizing and a method of using neither of them for data randomizing).

Similarly, in a range between each of the expanded keys by some continuous stages from the first stage and each of the expanded keys by some continuous stages up to the last stage, only one of any of the pairs of expanded keys at two stages identical to the number of stages from the first or last stage may be used for data randomizing as well. In this case, there may be provided a plurality of variations of selection methods if the above pair is used or not used. For example, in any pair as well, if either one is used, use (or non-use) may be selected randomly for each pair. For example, an alternate selection from the first and latter halves may be made in accordance with a predetermined reference. For example, it may be randomly selected as to whether the first some stages in order are used, whether the last some stages in order are used, or whether neither of them is used. Alternatively, selection may be made in accordance with a predetermined reference.

Figure 12:
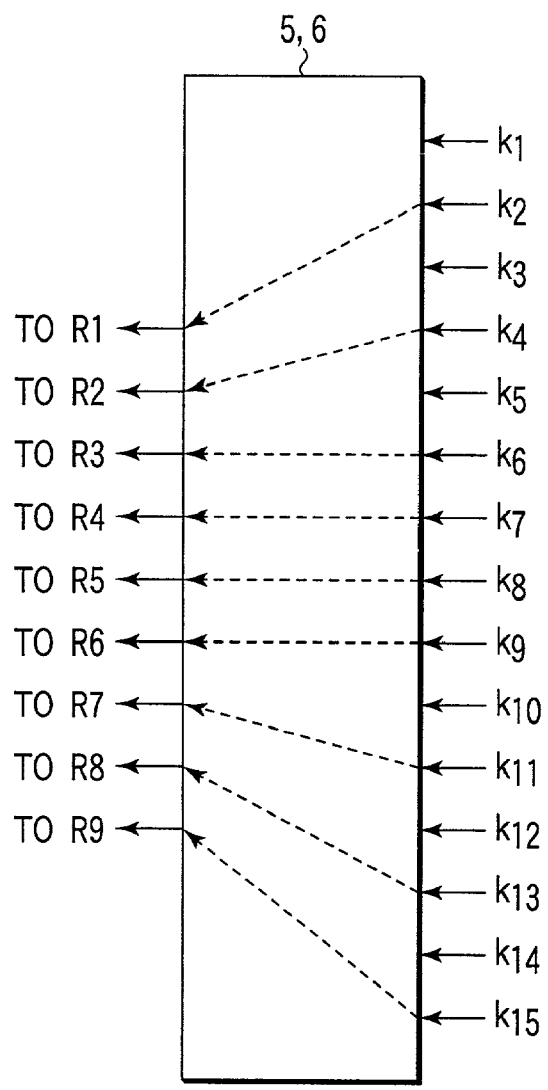
FIG. 12 is a view showing one example of connection between expanded keys and randomizing sections in FIGS. 10 and 12.

For example, as shown in FIG. 12, if expanded keys are capable of generated by fifteen stages, and randomizing processes are present by nine stages, $k_{15}$ is selected from an expanded key $k_1$ at the first stage and an expanded key $k_{15}$ at the last stage; $k_2$ is selected from $k_2$ and $k_{14}$ at such one inside stage; $k_{13}$ is selected from $k_3$ and $k_{13}$; $k_4$ is selected from $k_4$ and $k_{12}$; $k_{11}$ is selected from $k_5$ and $k_{11}$; and $k_6$ is selected from $k_6$ and $k_{10}$. In this case as well, expanded keys are used in order to be generated.

Figure 13:
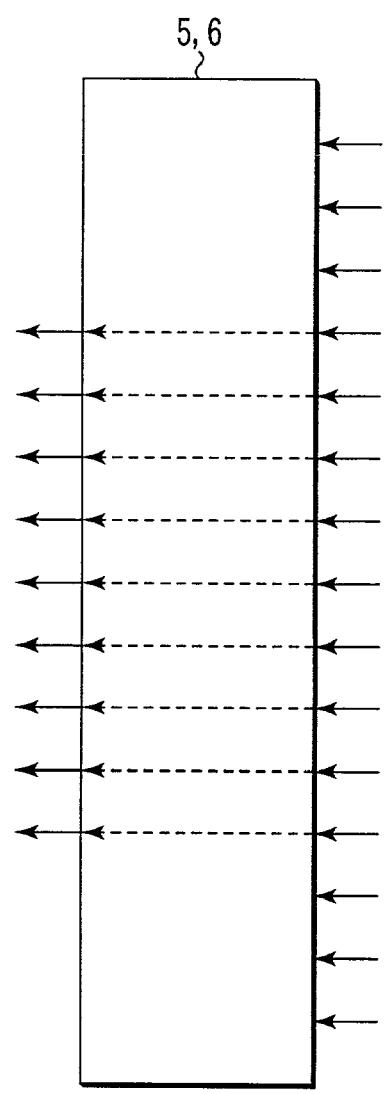
FIG. 13 is a view showing another example of connection between expanded keys and randomizing sections in FIGS. 10 and 12.

A range between each of the expanded keys by some continuous stages from the first stage and each of the expanded keys by some continuous stages up to the last stage may not be used. FIG. 13 shows this example.

Instead of not using the first stage and the last stage or a range between each of the expanded keys by some continuous stages from the first stage and each of the expanded keys by some continuous stages up to the last stage, only one of a corresponding pair may be used with respect to a range of the expanded keys by some continuous stages inside of this range, as described previously. FIG. 14 shows this example.

Of course, apart from the above examples, there are a plurality of variations.

In the above description, although expanded keys are used for data randomizing in order in which these keys are generated, if there is a margin for hardware such a memory or calculation time, the order in which the expanded keys are generated may be changed with that order in which the expanded keys are used for data randomizing according to such margin. This change of orders applies to the configurations shown in FIG. 1 and FIG. 2 as well. This change of orders is effective in view of safety against attack.

FIG. 15 shows an example when the order in which the expanded keys are generated is changed with the order in which the expanded keys are used for data randomizing.

In order to change orders, for example, an earlier generated expanded key may be temporarily stored in a memory to be used later than a later generated expanded key. If the order of one expanded key is changed, a memory capacity required for temporarily storing one expanded key only increases.

In order to prevent such memory increase, a required sub key may be obtained by acting an inverse function of a round function with the previous sub key. For example, if an expanded key $k_1$ obtained from a sub key $kc_1$ which is output from a round function $f_1$ at the first stage is used after using an expanded key $k_2$ obtained from a sub key $kc_2$ which is output from a round function $f_2$ at the second stage, after the sub key $kc_2$ has been obtained, an inverse function $f_2^{-1}$ of the round function $f_2$ of the second stage is acted on $kc_2$, whereby the sub key $kc_1$ is obtained (whereby the expanded key $k_1$ is obtained). Further, a round function $f_2$ of the second stage is acted with the sub key $kc_1$, whereby the sub key $kc_2$ is obtained, and a round function $f_3$ of the third stage is acted with the obtained sub key. In this manner, the expanded keys can be generated in order when they are used. If a series of round functions has a round trip configuration, the inverse function $f_2^{-1}$ of the round function $f_2$ is also provided at the same time, and thus, this inverse function may be utilized for the above processing.

In the meantime, although the above selection of expanded keys or change of orders has been fixed, such selection or change may be variable.

Figure 16:
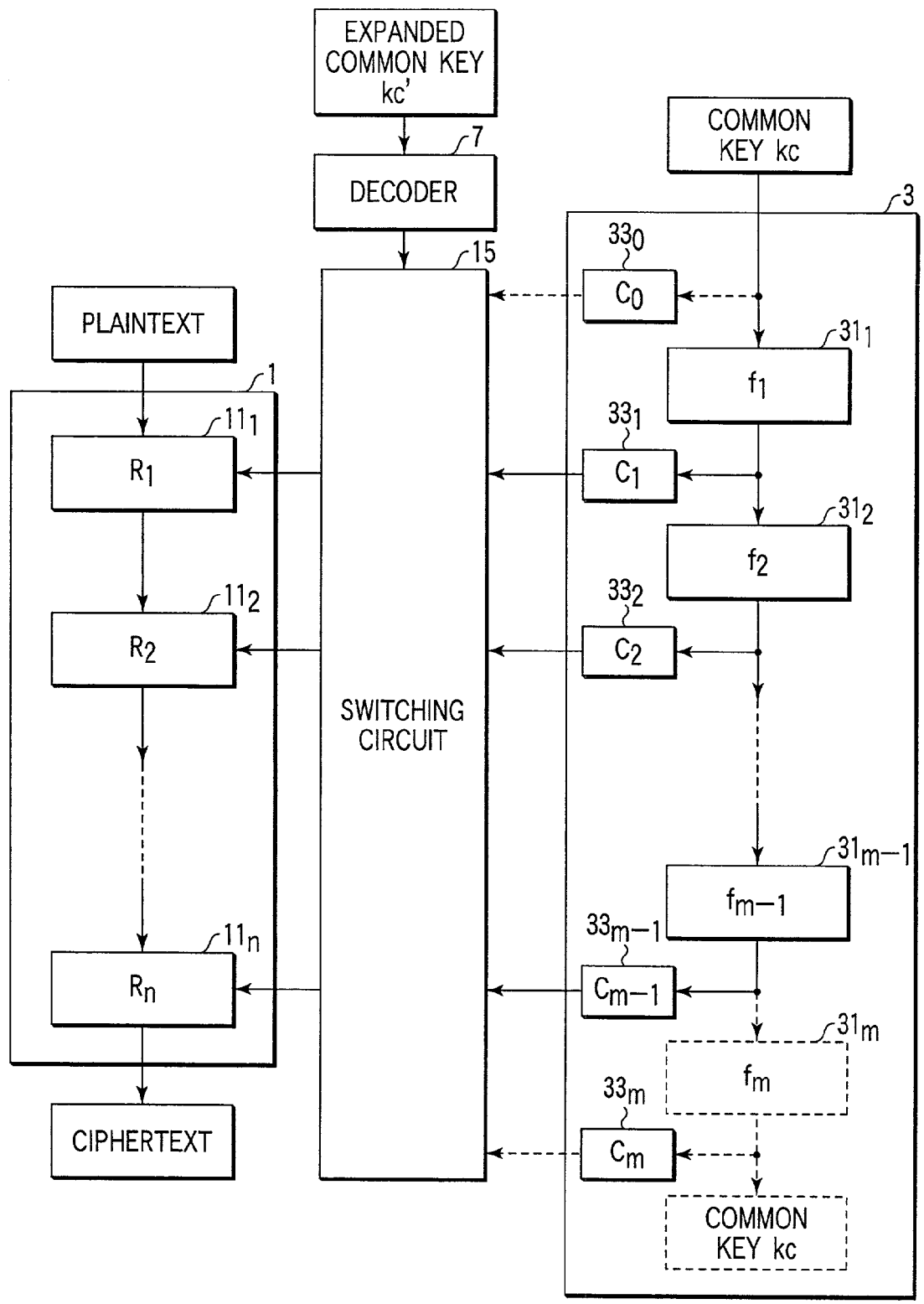
FIG. 16 is a view showing still another encryption apparatus according to the embodiment.
Figure 17:
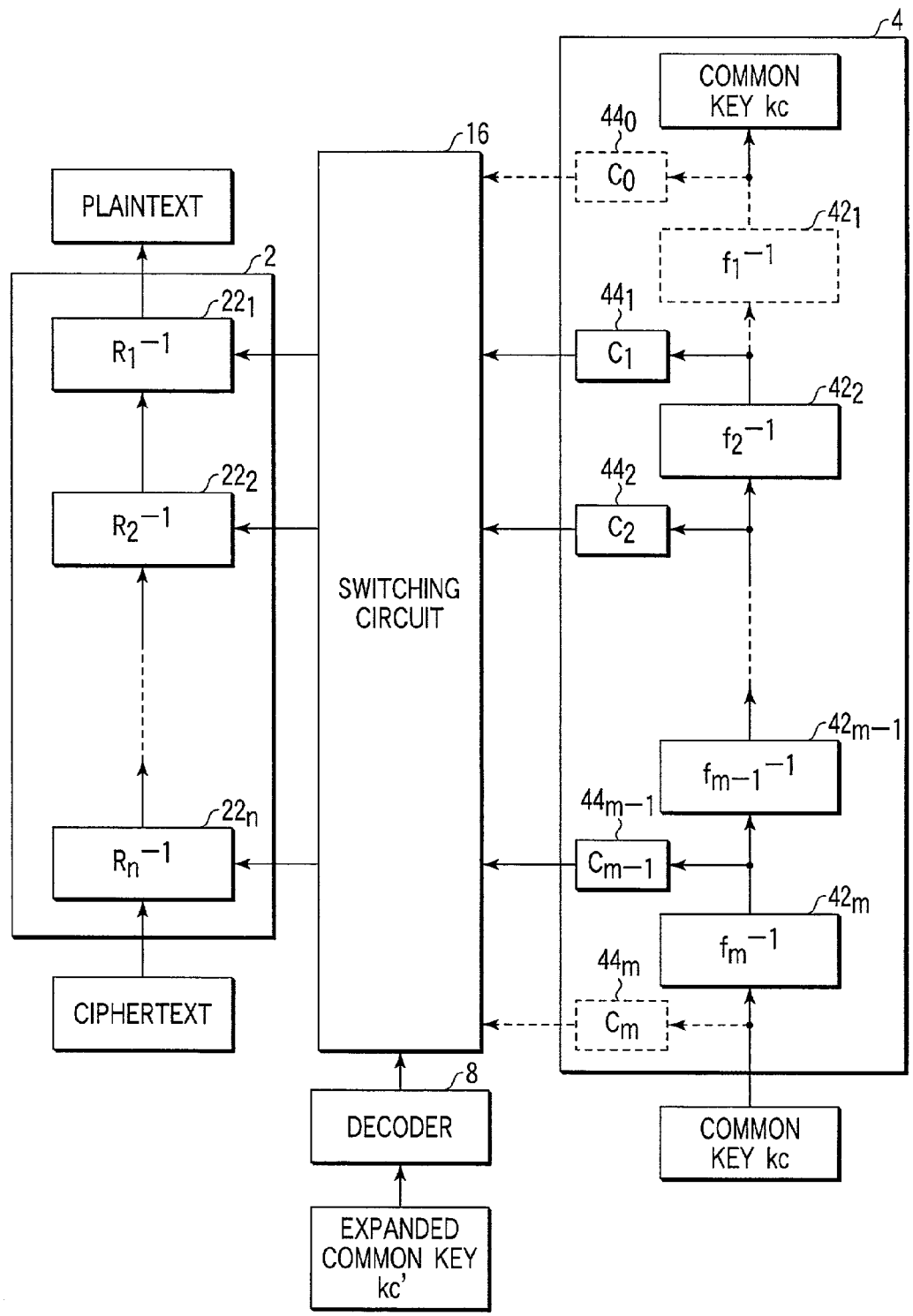
FIG. 17 is a view showing still another decryption apparatus according to the embodiment.

FIG. 16 and FIG. 17 each show an exemplary configuration that corresponds to that of the encryption/decryption apparatus shown in FIG. 10 and FIG. 11. In the figures, reference numerals 7 and 8 each denote a decoder, and reference numerals 15 and 16 each denote a switching circuit.

In this case, plural types of connection patterns (refer to FIG. 12 or the like) in which an expanded key $k_i$ is associated with each of randomizing processes $R_j$ are provided in advance, each pattern is encrypted, and is added to as an expanded common key kc'.

For encryption, the expanded common key kc' is input to the decoder 7. Then, the decoder 7 decodes the expanded common key kc', and controls switching with respect to the switching circuit 15 so as to achieve a connection pattern shown by the expanded common key kc' (for example, a pattern shown in FIG. 12 or the like).

These operations are made in a similar manner for decryption as well.

In the foregoing, although a connection or switching pattern is encrypted, another type of information such as information indicating the stage number relating to unused expanded key can be employed instead of using such pattern.

Such configuration is effective in view of safety against attack.

Figure 18:
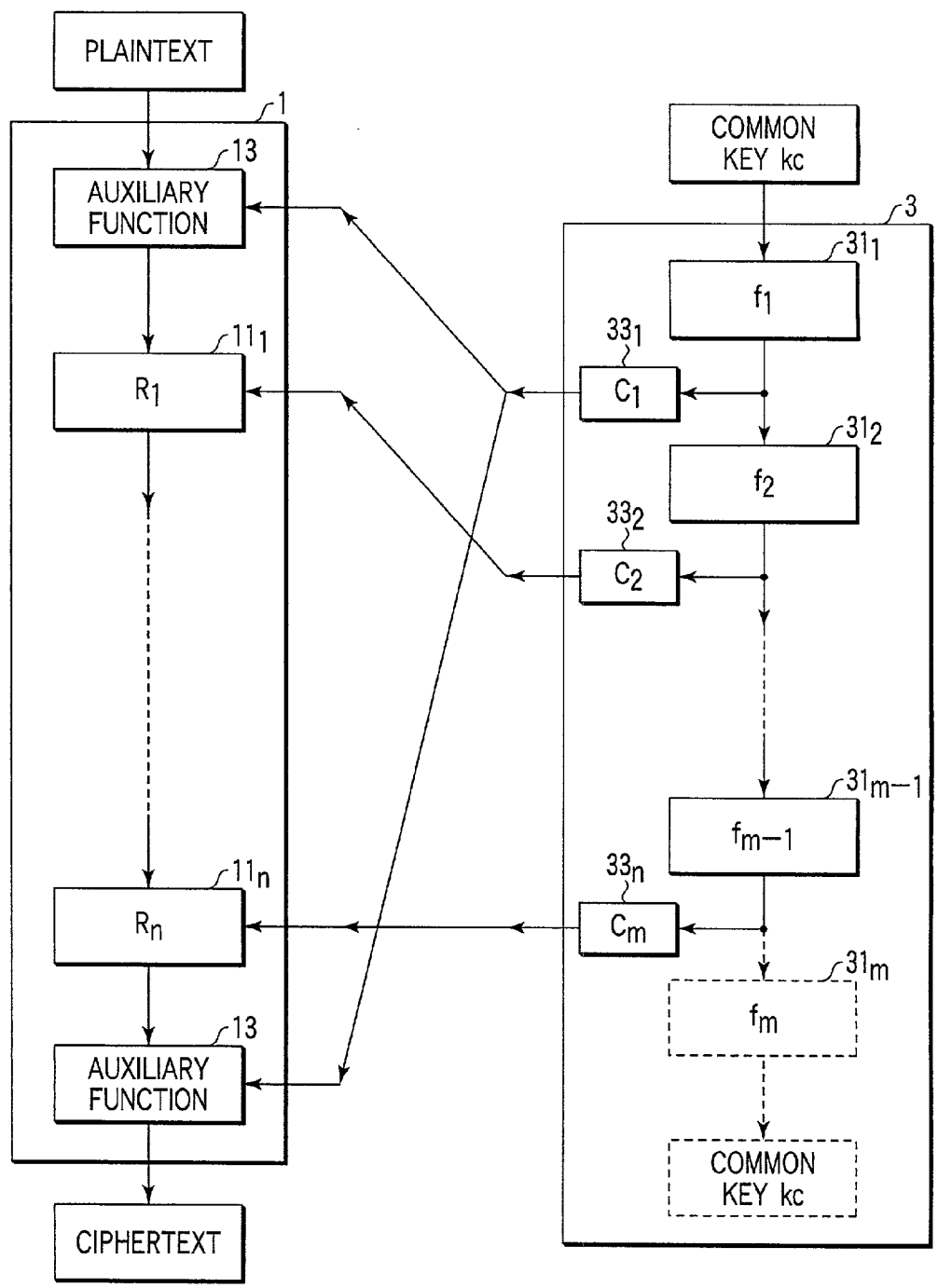
FIG. 18 is a view showing a further encryption apparatus according to the embodiment.

In each of the above exemplary configurations, as shown in FIG. 18, an auxiliary function such as pseudo Hadamard conversion may be inserted into the first stage and last stage. In this case, the same expanded keys (for example, expanded keys at the first stage) may be employed for the auxiliary functions at the first and last stages. Processing for defining a summation between left and right halves of block data as a new right half, and taking a summation of such new left half and the right half corresponds to Pseudo Hadamard conversion.

Hereinafter, a variation of a plurality of round processing sections $31_1$ to $31_n$ and $42_1$ to $42_{n+1}$ at the expanded key scheduling section 3 and 4 of the encryption apparatus and the decryption apparatus will be described.

FIG. 19 shows an exemplary configuration of one round processing section 31 or 42. In FIG. 19, reference numeral 101 denotes an eight-bit S-box; reference numeral 103 denotes a 32×k bit randomizing section based on an MDS (Maximum Distance Separable) matrix. In this example, 32×k bit data is input as all or some bit/bits of the sub key, and a 32×k bit expanded key is output. A randomizing section 103 is connected to a four-arrayed S-box 101, and a unit 102 of this connection is provided in k arrays.

Of course, as described previously, an expanded key scheduling section permits a variety of configurations.

In the meantime, a danger that (part) of the expanded keys at one stage (in general, last stage) is decrypted by one type of decryption is not completely deniable. If an expanded key at one stage is decrypted, inverse conversion of an expanded key converting section is performed, whereby a sub key (of a round function) at that stage is decrypted. As a result, there is a danger that all of the sub keys at the other stages are decrypted, and all the expanded keys are decrypted.

Because of this, at part of the expanded key converting sections (for example, one or several stages including last stage), a function of which inverse conversion is not easy (for example, exponentiation function) or a function of which an inverse function is not uniquely defined (for example, a multiple-to-one function) may be employed. This makes it possible to prevent an expanded key at another stage from being easily decrypted and to ensure safety. Of course, a function of which inverse conversion is not easy or a function of which an inverse function is not uniquely defined may be employed for all the expanded key converting sections.

All data on sub keys of the corresponding stages may be assigned to the expanded key converting section. Instead, a configuration in which only part of the sub keys of the corresponding stages is passed is established so as not to decode all data on the sub keys, thereby making it possible to ensure safety.

In a specific attack called side channel analysis, a key is estimated for a hardware configured encryption apparatus based on information leakage from power or electromagnetic waves from a device such as IC card. In particular, one circuit in data randomizing processing, if there are a plurality of circuit portions having the same configurations, and an input bit row to these circuits and a key bit row used in that circuit (expanded key itself or partial data on expanded key) is identical to each other, it is estimated that the input bit rows with respect to these circuits are identical from the identity of side channel information (for example, change in current consumption). Therefore, in generating an expanded key, it is desired to generate a key in which side channel analysis is facilitated, the key causing a problem in IC card or the like.

In mutually different processing elements (circuit portions) in which at least a part of input and output of processing elements (circuit portions) can be directly observed or estimated, it is effective to employ a method of generating an expanded key such that the same expanded keys are not used.

The expanded key scheduling section, or expanded key converting section and round processing section, or the round processing section, are designed so as not to ensure that all the expanded keys do not always coincide with each other and so as to permit accidental coincidence.

The expanded key converting section, or expanded key converting section and round processing section, or the round processing section, are designed so as not to ensure that all the expanded keys do not always coincide with each other. In addition, for generation of a common key, it is determined whether or not all the expanded keys are different from each other, whereby such common key may be used only if it is determined that all the expanded keys are different.

Here, there are a variety of levels with respect to coincidence of expanded keys. For example, when all bits of two expanded keys are identical, it may be determined that two expanded keys are identical. When data at a predetermined byte location of two expanded keys are identical, it may be determined that two expanded keys are identical. When there is a certain relationship between data on a predetermined byte location of two expanded keys, it may be determined that two expanded keys are identical. Apart from these determinations, a variety of coincidence determination methods can be employed.

Hereinafter, a variation of a plurality of round processing sections in the encryption/decryption apparatus will be described.

FIG. 20 shows an exemplary configuration of a series of round processing sections 31 and 42. An example of FIG. 20 shows a three-stage configuration. Each of the stages is connected in series. FIG. 20 exemplifies an example when the common key has 128 bits, and the expanded key of each stage has 64 bits. In the figure, reference numeral 105 denotes a nonlinear function (mapping function) F, and reference numeral 107 denotes an exclusive OR. The nonlinear function (F) 105 and exclusive OR 107 corresponds to the round processing section 31 and 42.

The nonlinear function F may be identical to each other through all the stages or may be different from each other depending on each stage. In the latter case, each function 105 has the same configuration, but may depend on constants that differ depending on each stage.

Either of the configuration shown in FIG. 20 and a configuration having an inverse function of FIG. 20 can be employed on the encryption side (or decryption side).

In general, even if a powerful decryption technique such as differential decryption technique or linear decryption technique is employed, several bits of the expanded keys at the last stage can only be specified at most. Thus, in a series of round functions, there may occur no problem with safety even in a simple Feistel structure as shown in FIG. 20. However, if a safer structure is desired to prepare for introduction to a more powerful decryption technique, a series of round functions as shown in FIG. 21, for example, may be employed.

An example of FIG. 21 shows a two-stage configuration. Each of the stages is connected in series. FIG. 21 exemplifies a case in which the common key has 128 bits, and the expanded key of each stage has 64 bits. In the figure, reference numerals 109, 111, and 113 denote nonlinear functions "f", "g", and "h", respectively, and reference numeral 115 denotes an exclusive OR. The nonlinear functions "f", "g", and "h" may be identical to or different from each other. Some of these functions may be identical to each other.

FIG. 22 shows an exemplary configuration of the nonlinear functions (f) 109, (g) 111, and (h) 113. In FIG. 22, reference numeral 119 denotes an eight-bit S-box, and reference numeral 121 denotes a 32-bit randomizing section based on an MDS matrix.

In FIG. 21, as compared with FIG. 20, it is more difficult to uniquely determine a sub key from a 128-bit output.

FIG. 23 shows an inverse function of a function shown in FIG. 21. Both of thee functions shown in FIG. 21 and FIG. 23 may be employed on the encryption side (or decryption side).

Hereinafter, a description will be given with respect to a specific example of the encryption apparatus to which the present invention is applied.

Figure 24:
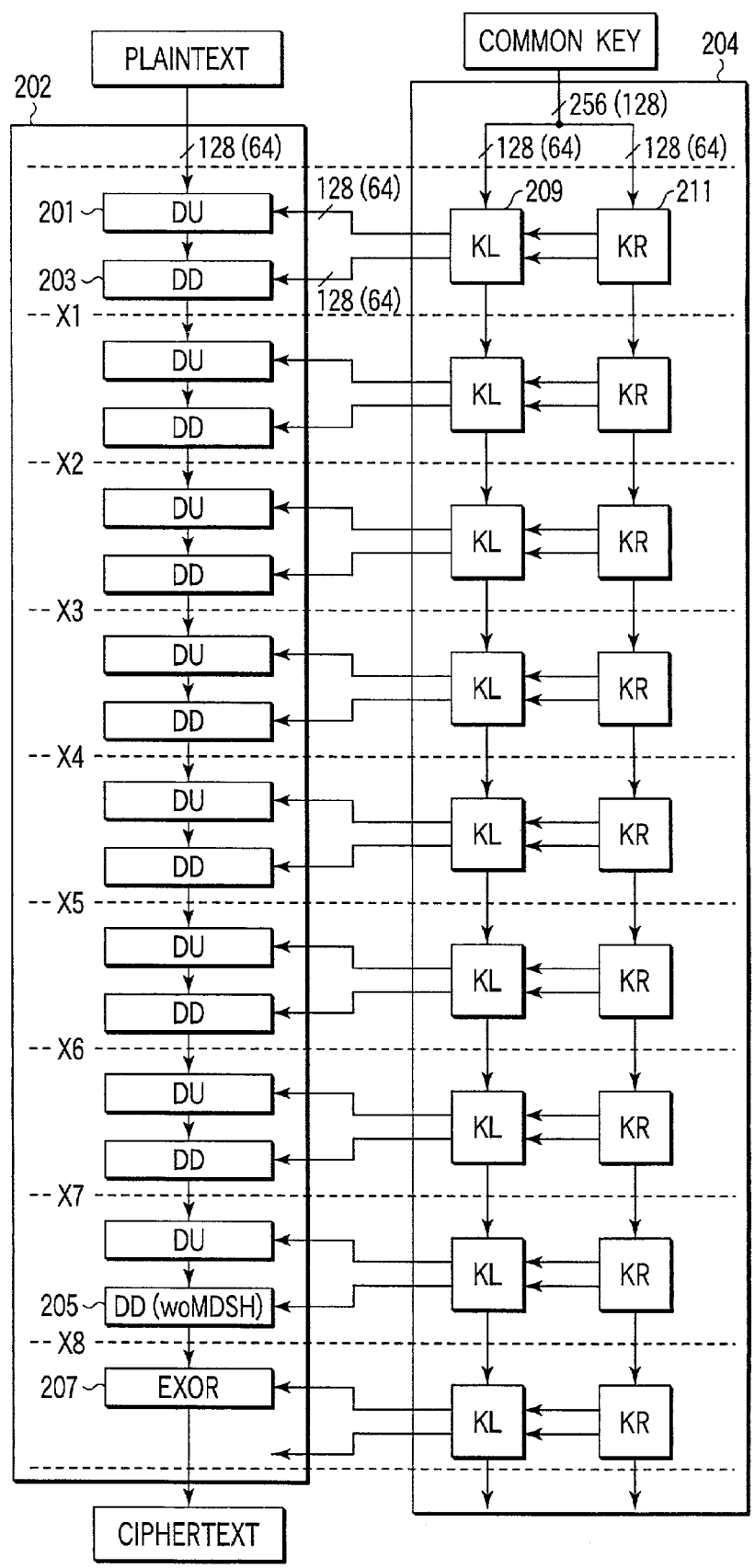
FIG. 24 is a view showing still another example of the encryption apparatus according to the embodiment.

FIG. 24 shows an exemplary configuration of the encryption apparatus.

An example is shown when this encryption apparatus has a 128-bit (or 64-bit) block cipher, a common key has a 256-bit (or 128-bit), and one stage is of 256-bit (or 128-bit). An example shown when a series of round functions has a round trip configuration. An example shown when there is provided a nest type SPN structure in which a lower order SPN structure is recursively embedded in an S-box portion of a general SPN structure.

In FIG. 24, in a data randomizing section 202, following a repetition structure of a round function (DU) processing section 201 and a round function (DD) processing section 203, there are connected the round function (DU) processing section 201, a round function (DD(without MDSH)) processing section 205 and a round function (EX-OR) 207.

In an expanded key scheduling section 204, a pair of unit (KL) 209 and unit (KR) 211 corresponds to a round function for one stage. However, in an example shown in FIG. 24, there is provided a structure in which data appeared between the units 209 and data between the units 211 are not a sub key shown in FIG. 1, and the sub key appears inside of the unit 209 or the unit 211.

FIG. 25 shows an exemplary configuration of the unit (DU) 201 shown in FIG. 24 for a 128-bit block cipher. In FIG. 25, reference numeral 215 denotes an 8-bit exclusive OR for key addition; reference numeral 217 denotes an 8-bit S-box; and reference numeral 219 denotes a 32-bit randomizing section based on an MDS matrix. Units 213 are provided in four rows in parallel.

In the 64-bit block cipher, the units 213 are provided in two rows in parallel.

FIG. 26 shows an exemplary configuration of the unit (DD) 203 shown in FIG. 24 for a 128-bit block cipher. In FIG. 26, reference numeral 221 denotes an 8-bit exclusive OR for key addition; reference numeral 223 denotes an 8-bit S-box; and reference numeral 225 denotes a 128-bit randomizing section based on an MDS matrix. Sixteen exclusive ORs 221 and S-boxes 223 are connected to the randomizing section 225.

FIG. 27 shows an exemplary configuration of the unit (DD:woMDHS) 205 shown in FIG. 24 in the 128-bit block cipher. In FIG. 27, reference numeral 227 denotes an 8-bit exclusive OR for key addition; and reference numeral 229 denotes an 8 bit S-box. Sixteen exclusive ORs 227 and S-boxes 229 are provided.

In a 64-bit block cipher, eight exclusive ORs 227 and S-boxes 229 are provided.

In the 128-bit block cipher, the unit 207 in FIG. 24 is an exclusive OR for adding a 128-bit expanded key to a 128-bit block data output from the unit 205.

In the 64-bit block cipher, the unit 207 in FIG. 24 is an exclusive OR for adding a 64-bit expanded key to a 64-bit block data output from the unit 205.

Figure 28:
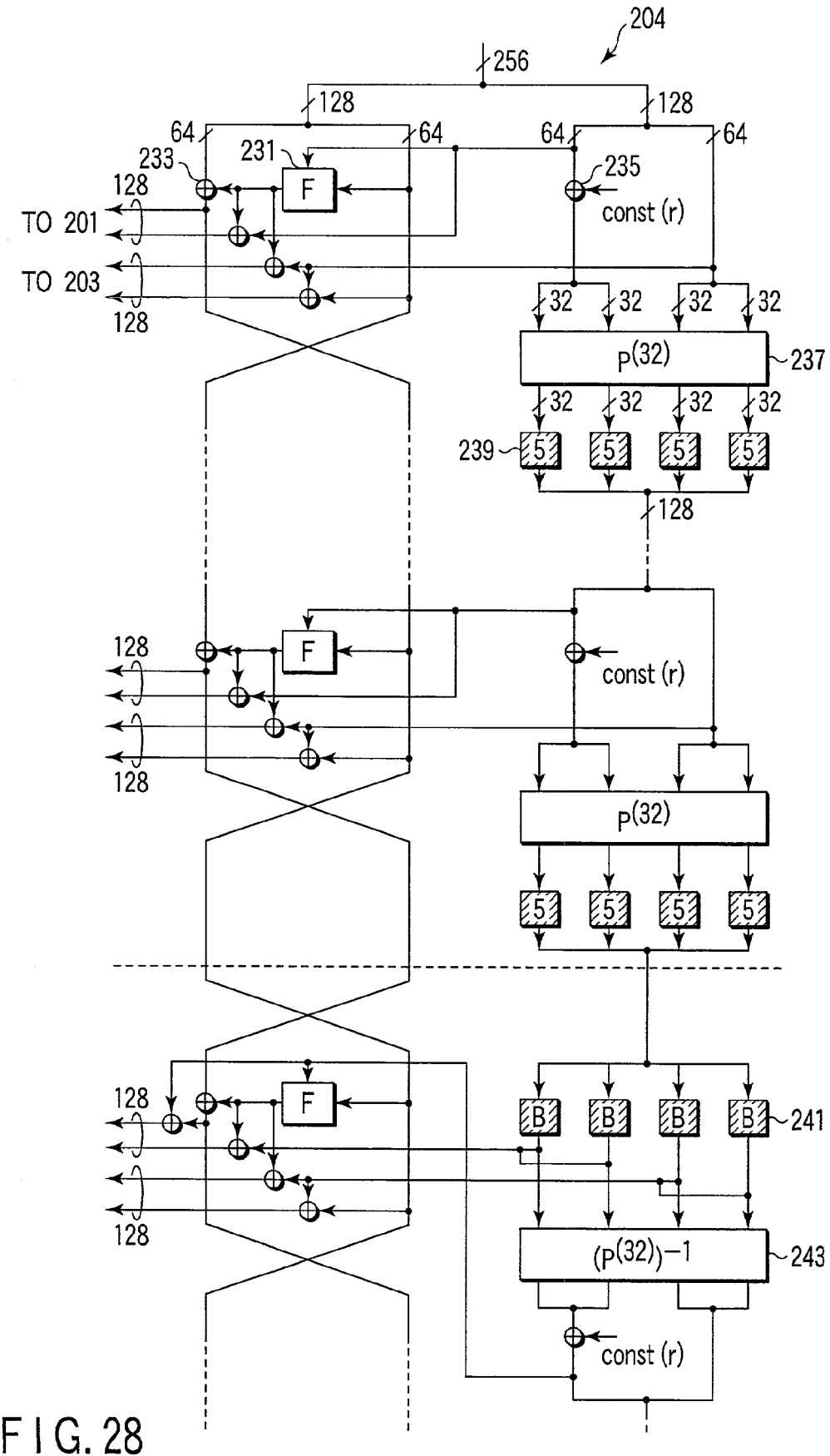
FIG. 28 is a view showing one example of an expanded key scheduling section shown in FIG. 24.

FIG. 28 shows an exemplary configuration of an expanded key scheduling section 204 shown in FIG. 24 if a bit length of a common key is 256 bits. FIG. 28 shows two stages in the first half preceding the return point and one stage in the second half succeeding the return point of the round trip configuration. In the figure, reference numeral 231 denotes a nonlinear function F; reference numeral 233 denotes an exclusive OR; and reference numeral 235 denotes an exclusive OR with a constant that differs depending on each stage. The units 231, 237, 239, 241, and 243 will be described later.

Figure 29:
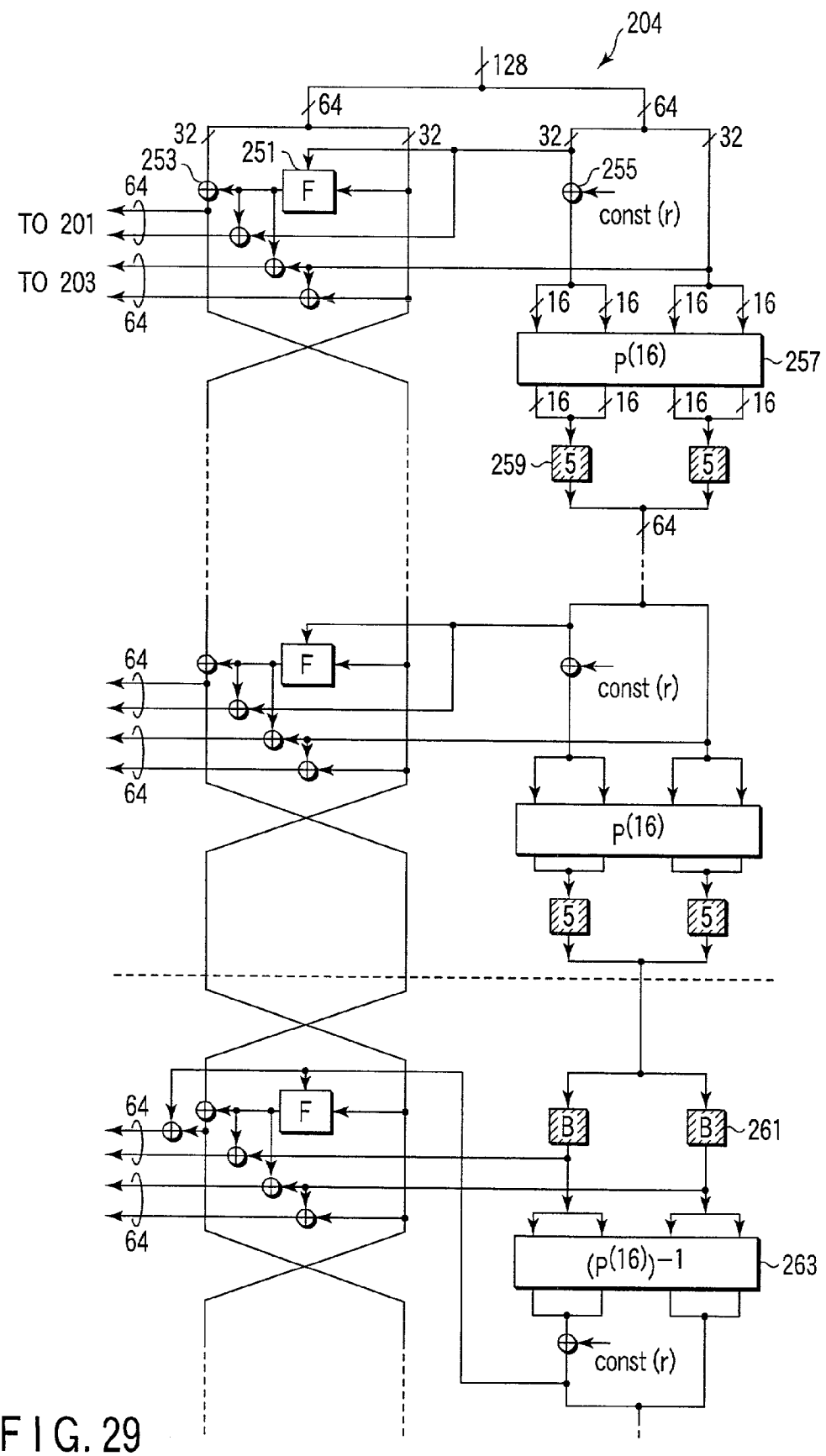
FIG. 29 is a view showing another example of an expanded key scheduling section shown in FIG. 24.

FIG. 29 shows an exemplary configuration of an expanded key scheduling section 204 shown in FIG. 24 if a bit length of a common key is 128 bits. FIG. 29 shows only the first stage portion and a return portion of the round trip configuration. In the figure, reference numeral 251 denotes a nonlinear function F; reference numeral 253 denotes an exclusive OR; and reference numeral 255 denotes an exclusive OR with constants that differ depending on each stage. The units 251, 257, 259, 261, and 263 will be described later.

FIG. 30 shows an exemplary configuration of the nonlinear function processing section 231 or 251 shown in FIG. 28. In the figure, reference numeral 2311 denotes an exclusive OR; and reference numeral 2313 denotes an S-box. Reference numerals 2315 and 2317 will be described later.

Now, a description will be given with respect to the unit 237 shown as $P^{(32)}$ in FIG. 28; the unit 257 shown as $P^{(16)}$ in FIG. 29; the unit 2315 shown as $P^{(16)}$ in FIG. 30; and the unit 2317 shown as $P^{(8)}$ in FIG. 30. FIG. 31 shows a general exemplary configuration common to these units. In the figure, reference numeral 265 denotes an exclusive OR, where an operation for obtaining an exclusive OR between "i" bits and another "i" bits is performed four times. $P^{(8)}$, $P^{(16)}$, and $P^{(32)}$ in each of the figures expresses this configuration as $P^{(i)}$. That is, the unit 237 shown in FIG. 28 is defined as i=32 in the configuration in FIG. 31; the unit 257 shown in FIG. 29 is defined as i=16 in the configuration in FIG. 31; the unit 2315 shown in FIG. 30 is defined as i=16 in the configuration in FIG. 31; and the unit 2317 shown in FIG. 30 is defined as i=8 in the configuration in FIG. 31.

FIG. 32 shows an exemplary configuration of $(P^{(i)})^{-1}$ that is an inverse conversion of $P^{(i)}$. In the figure, reference numeral 267 denotes an exclusive OR. The unit 243 shown in FIG. 28 is defined as i=32 in the configuration shown in FIG. 31, and the unit 263 shown in FIG. 29 is defined as i=16 in the configuration shown in FIG. 31.

In FIG. 30, although the description is made for a 128-bit block cipher, it is possible to modify the nonlinear function for the case of a 64-bit block cipher. In the nonlinear function section 251 shown in FIG. 29, $P^{(8)}$ is changed to $P^{(4)}$, and $P^{(16)}$ is changed to $P^{(8)}$.

Now, a description will be given with respect to the units 239, 259 and 2313 shown as "5" in FIGS. 28–30 and the units 241 and 261 shown as "B" in FIG. 29 and FIG. 30.

Figure 33:
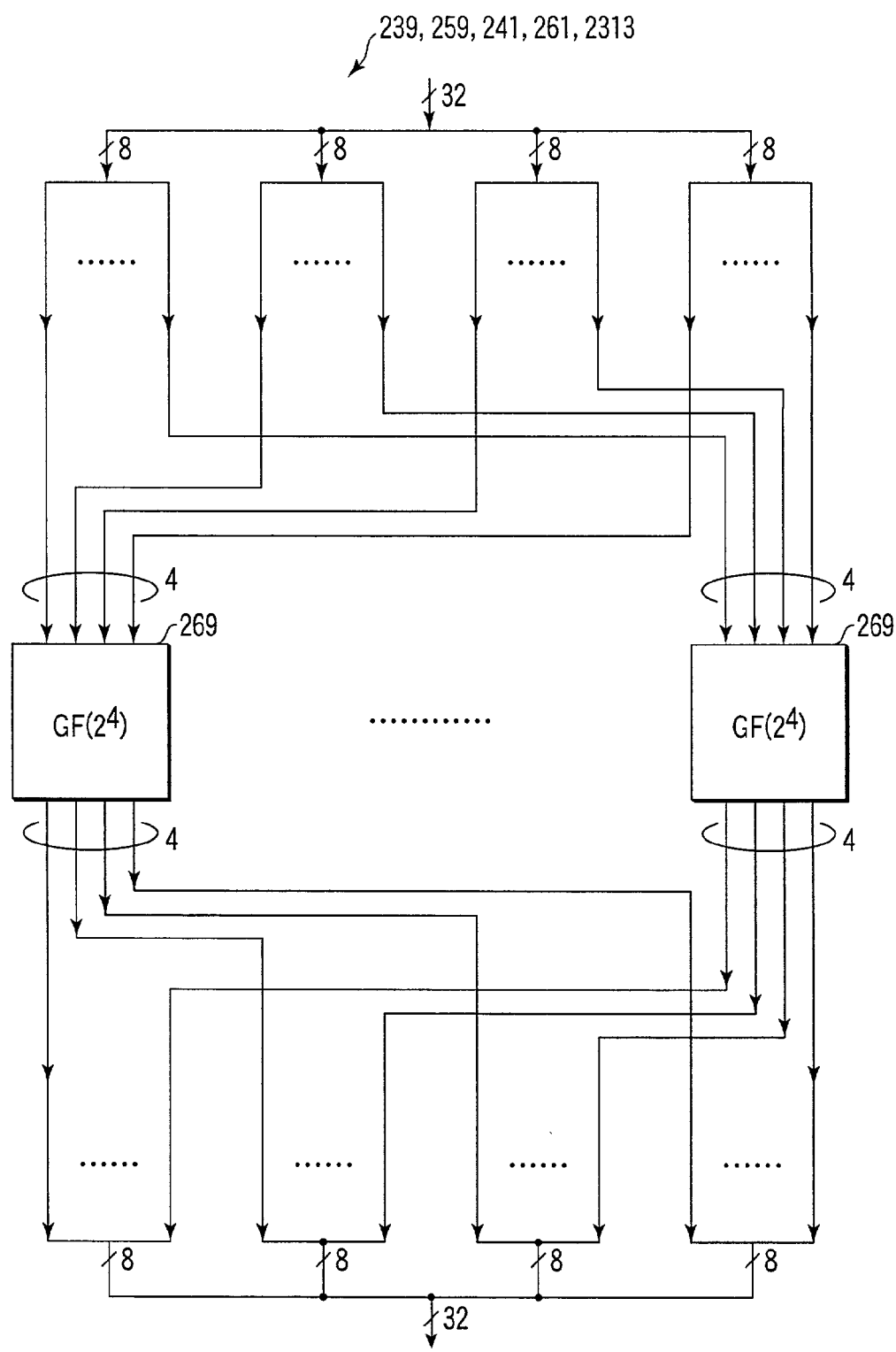
FIG. 33 is a view illustrating a unit performing multiplication on a Galois field shown in FIGS. 28 and 29.

FIG. 33 shows an exemplary configuration of the units shown as "5" and the units shown as "B". A difference between them lies in contents of functions in the unit 269 shown in FIG. 33.

In FIG. 33, an element "5" or "B" of a Galois field GF ($2^4$) is multiplied with the input.

That is, a 32-bit input is divided into four groups of eight-bit; one bit is connected at the same location of eight-bit data (for example, in FIG. 33, this is shown by way of example of the least significant bit and the most significant bit); the collected bit is defined as data of four bits in one group; and 8 groups of four-bit data each are regarded as an element of GF ($2^4$). The four-bit data each is multiplied by "5" or "B" by each unit 269 (in accordance with multiplication on the Galois field), and then, each of the bits is regrouped into four groups of eight-bit.

In the foregoing, although a description has been given for the casein which the bits at the same positions are collected, it is possible to carry out processing by exclusively extracting bits at the different positions.

The multiplication on the Galois field may be carried out by referring to the table, by way of calculation, or by way of a real circuit.

FIG. 34A and FIG. 34B each show an exemplary configuration of a portion of the unit 269 shown in FIG. 33, i.e., a wiring expression (a wiring pattern) of multiplication on GF ($2^4$), where FIG. 34A shows the configuration with respect to element "5", and FIG. 34B shows the configuration with respect to element "B". As described previously, exclusive OR is calculated at a connection point 271. That is, in this case, the units 239 and 259 shown as "5" in FIG. 28 and FIG. 29 can be configured as shown in FIG. 33 and FIG. 34A. The units 241 and 261 shown as "B" in FIG. 28 and FIG. 29 can be configured as shown in FIG. 33 and FIG. 34B.

FIG. 35 shows wiring patterns of multiplication on the Galois field GF ($2^4$) for elements "1" to "F". At the connection point, exclusive OR is calculated.

In the meantime, in expanded keys used at a portion at which an object acting an expanded key of a data randomizing section is known or can be estimated comparatively easily, for example, in the expansion keys to the first exclusive OR of the data randomizing section or an exclusive OR before the last key addition that enables data estimation from output and key estimation, it is preferable to prevent the expanded keys from always coinciding with each other or having a certain relationship in units of calculation elements at the different positions (in this case, in units of eight units).

As an exemplary configuration, expanded keys are generated (or a common key is selected) so that there does not occur any coincidence which is always obtained in units of elements (in this example, in units of eight bits) between an expanded key used for the first exclusive OR calculation of the above data randomizing section and an expanded key for an exclusive OR before the last key addition. This makes it possible to prevent a coincidence of expanded keys which facilitates side channel analysis or establishment of a certain relationship.

In a configuration of the decryption apparatus that corresponds to that shown in FIG. 24, a function with respect to the data randomizing section is obtained as an inverse function of the data randomizing section 202 shown in FIG. 24. With respect to the expanded key scheduling section, if the round functions at the last stage are provided on both of the encryption side and decryption side, a configuration similar to that of the expanded key scheduling section 204 shown in FIG. 24 is obtained. Of course, the round functions of the last stage may not be provided on the encryption and decryption sides, respectively.

In the above embodiment, although a description has been given with reference to FIG. 1 to FIG. 35 by way of showing an example of a specific bit length such as 128 bits, of course, block data of any bit length is applicable.

A data randomizing section is applicable even if the section provides any configuration.

FIG. 36 shows another exemplary configuration of the expanded key scheduling section 204A shown in FIG. 24 if a bit length of a common key is 256 bits. FIG. 36 is based on the round trip configuration shown in FIG. 3 and shows only the first stage portion and the return portion of the round trip configuration. In the figure, reference numeral 231A denotes a nonlinear function F; reference numeral 233 denotes an exclusive OR; and reference numeral 235 denotes an exclusive OR with constants that differ depending on each stage. The units 231A, 237A, 239A, 240A, 241A, 242A, and 243A will be described later.

Figure 37:
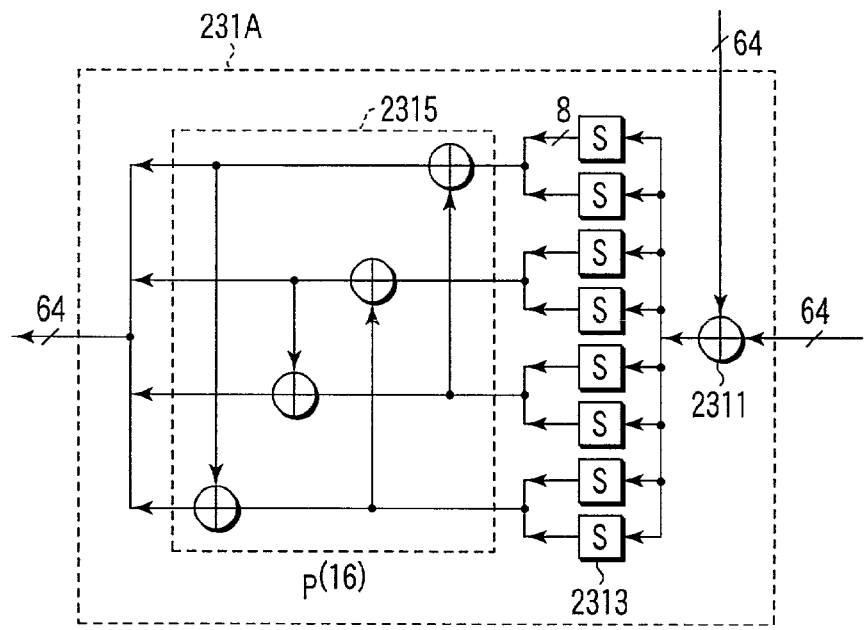
FIG. 37 is a view illustrating a nonlinear function unit F shown in FIG. 36.

FIG. 37 shows an exemplary configuration of the nonlinear function processing section 231A shown in FIG. 36. In the figure, reference numeral 2311 denotes an exclusive OR; reference numeral 2313 denotes an S-box; and reference numeral 2315 denotes $P^{(16)}$ unit.

Figures 38A, 38B:
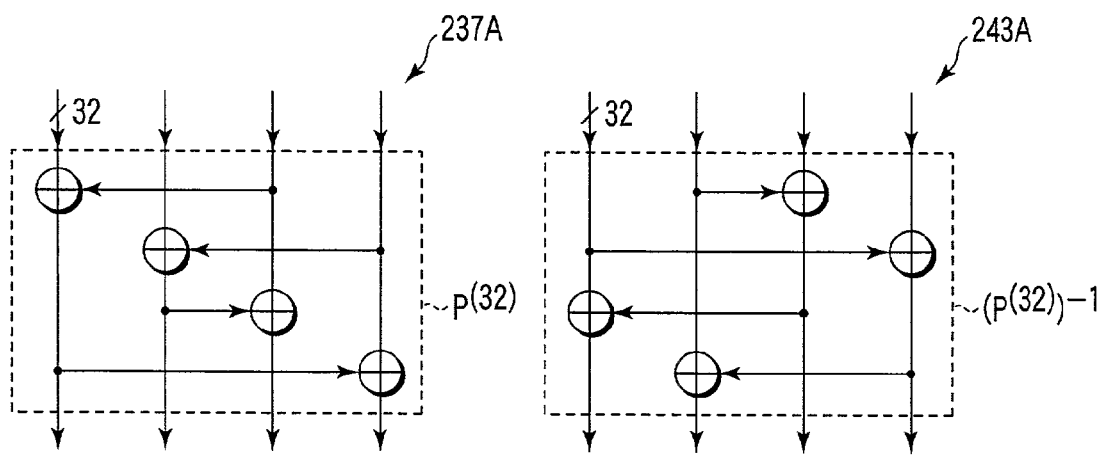
FIGS. 38A and 38B are views illustrating examples of a unit performing an exclusive OR operation shown in FIG. 36.

FIG. 38A and FIG. 38B show details of $P^{(32)}$ unit 237A and $(P^{(32)})^{-1}$ unit 243A of FIG. 36. An operation for obtaining an exclusive OR between 32 bits and another 32 bits is performed four times.

The units 239A, 240A, 241A and 242A shown as "5", "E", "B" and "3" in FIG. 36 multiply the elements "5", "E", "B" and "3" of a Galois field GF ($2^4$) with the input.

Figure 39A:
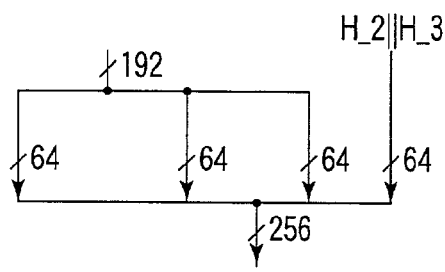
FIGS. 39A and 39B are views illustrating examples of a padding stage used in FIG. 36.
Figure 39B:
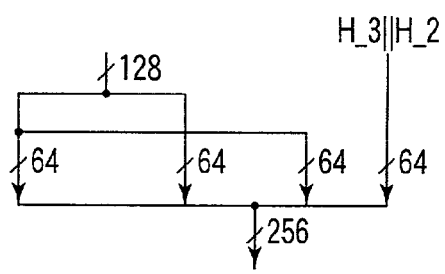
Figure 40:
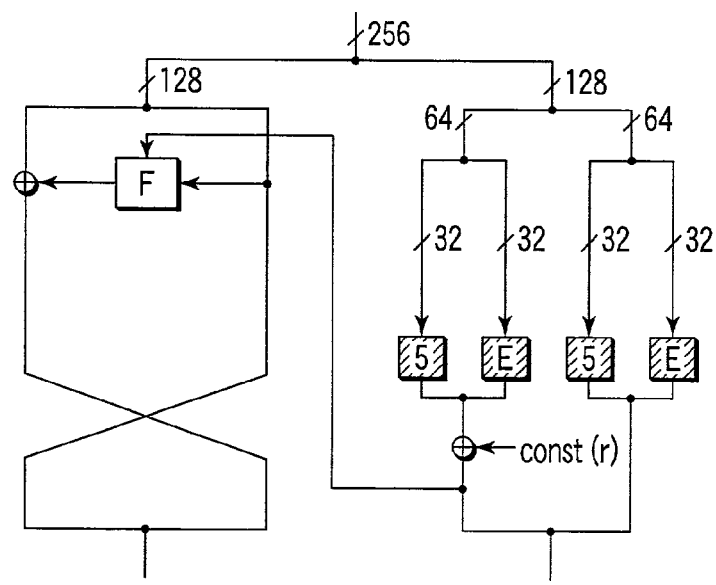
FIG. 40 is a view illustrating an example of a dummy stage used in FIG. 36.

The constants const(r) that differ depending on each stage and input to the exclusive OR 235 are shown in Table 1. Tables 2 and 3 show the constants const(r) where the bit length of the common key is 192 bits and 128 bits. Stage indicates the stage number counted from the original key (common key). In order to expand the bit length to 256 bits, a padding is performed at the first stage where the bit length of the common key is 192 bits and 128 bits. FIG. 39A and FIG. 39B show the padding stages for the common key of 192 bits and 128 bits. FIG. 40 shows a dummy stage which is common to the expanded key generating section for the common key of 256 bits, 192 bits and 128 bits. Table 4 shows constants G(0) to G(5).

TABLE 1

256 bits (8R)

| Expanded Key | Function | Constant | Stage |
|---|---|---|---|
| | No padding | | |
| — | KEp | G(5) | Dummy |
| K1 | KEp | G(4) | 1 |
| K2 | KEp | G(0) | 2 |
| K3 | KEp | G(2) | 3 |
| K4 | KEp | G(1) | 4 |
| K5 | KEp | G(3) | 5 |
| K6 | KEc | G(3) | 5 |
| K7 | KEc | G(1) | 4 |
| K8 | KEc | G(2) | 3 |
| K9 | KEc | G(0) | 2 |

TABLE 2

192 bits (7R)

| Expanded Key | Function | Constant | Stage |
|---|---|---|---|
| — | H_2 ‖ H_3 | | Padding |
| — | KEp | G(5) | Dummy |
| K1 | KEp | G(1) | 1 |
| K2 | KEp | G(0) | 2 |
| K3 | KEp | G(3) | 3 |
| K4 | KEp | G(2) | 4 |
| K5 | KEc | G(2) | 4 |
| K6 | KEc | G(3) | 3 |
| K7 | KEc | G(0) | 2 |
| K8 | KEc | G(1) | 1 |

TABLE 3

128 bits (6R)

| Expanded key | Function | Constant | Stage |
|---|---|---|---|
| — | H_2 ‖ H_3 | | Padding |
| — | KEp | G(5) | Dummy |

TABLE 3-continued 128 bits (6R)

| Expanded key | Function | Constant | Stage |
|---|---|---|---|
| K1 | KEp | G(0) | 1 |
| K2 | KEp | G(1) | 2 |
| K3 | KEp | G(2) | 3 |
| K4 | KEp | G(3) | 4 |
| K5 | KEc | G(3) | 4 |
| K6 | KEc | G(2) | 3 |
| K7 | KEc | G(1) | 2 |

TABLE 4

| G(0) | H_3 ‖ H_0 |
|---|---|
| G(1) | H_2 ‖ H_1 |
| G(2) | H_1 ‖ H_3 |
| G(3) | H_0 ‖ H_2 |
| G(4) | H_2 ‖ H_3 |
| G(5) | H_1 ‖ H_0 |

H_0 = 0x5A827999
H_1 = 0x6ED9EBA1
H_2 = 0x8F1BBCDC
H_3 = 0xCA62C1D6
H_4 = 0xD7DEF58A

Figure 41:
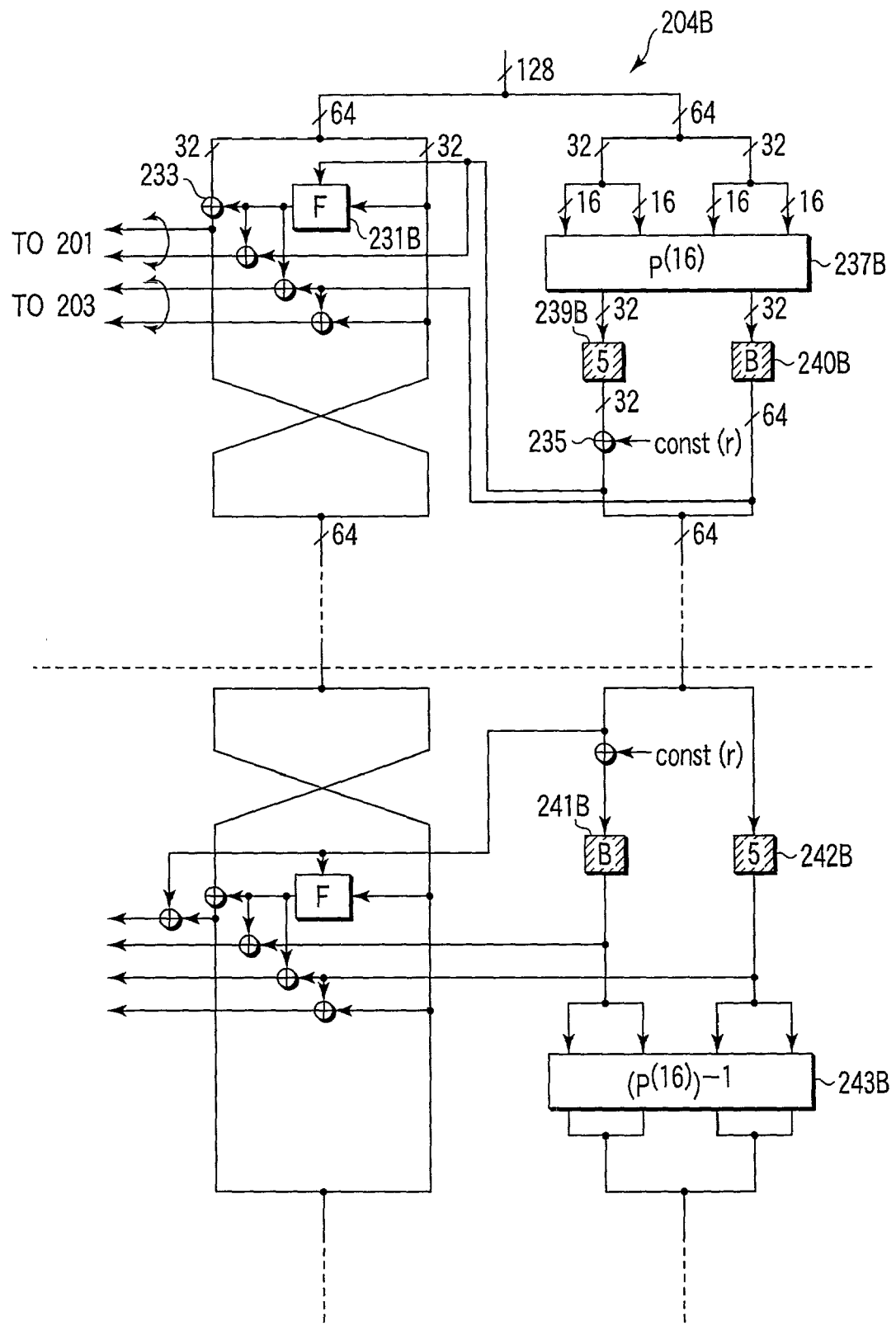
FIG. 41 is a view showing still another example of an expanded key scheduling section of the encryption apparatus according to the embodiment.

FIG. 41 shows still another exemplary configuration of the expanded key scheduling section 204B shown in FIG. 24 if a bit length of a common key is 128 bits. FIG. 41 is based on the round trip configuration shown in FIG. 3 and shows only the first stage portion and the return portion of the round trip configuration. In the figure, reference numeral 231B denotes a nonlinear function F; reference numeral 233 denotes an exclusive OR; and reference numeral 235 denotes an exclusive OR with constants that differ depending on each stage. The units 231B, 237B, 239B, 240B, 241B, 242B, and 243B will be described later.

Figure 42:
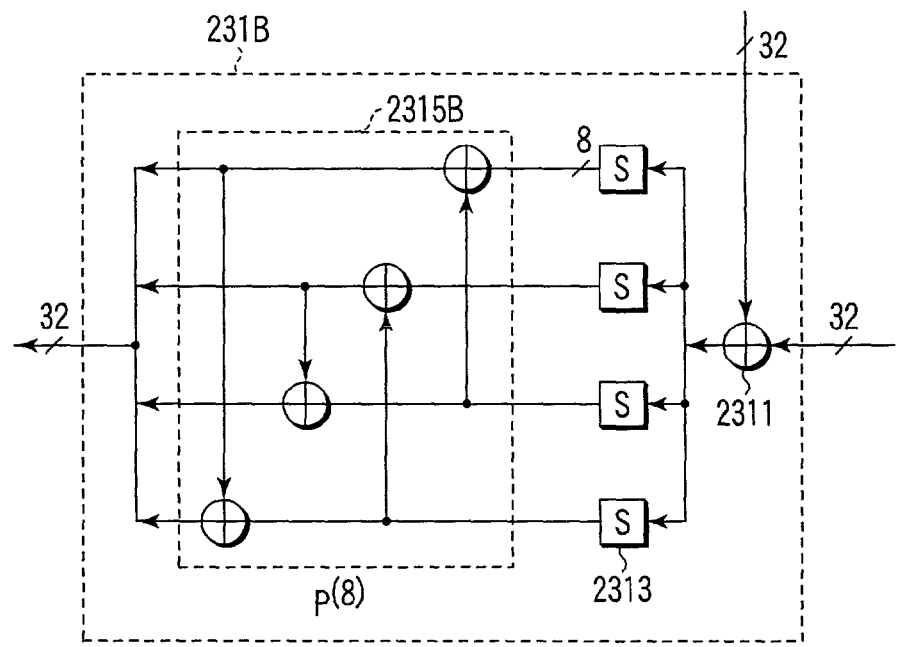
FIG. 42 is a view illustrating a nonlinear function unit F shown in FIG. 41.

FIG. 42 shows an exemplary configuration of the nonlinear function processing section 231B shown in FIG. 41. In the figure, reference numeral 2311 denotes an exclusive OR; reference numeral 2313 denotes an S-box; and reference numeral 2315B denotes $P^{(8)}$ unit.

Figures 43A, 43B:
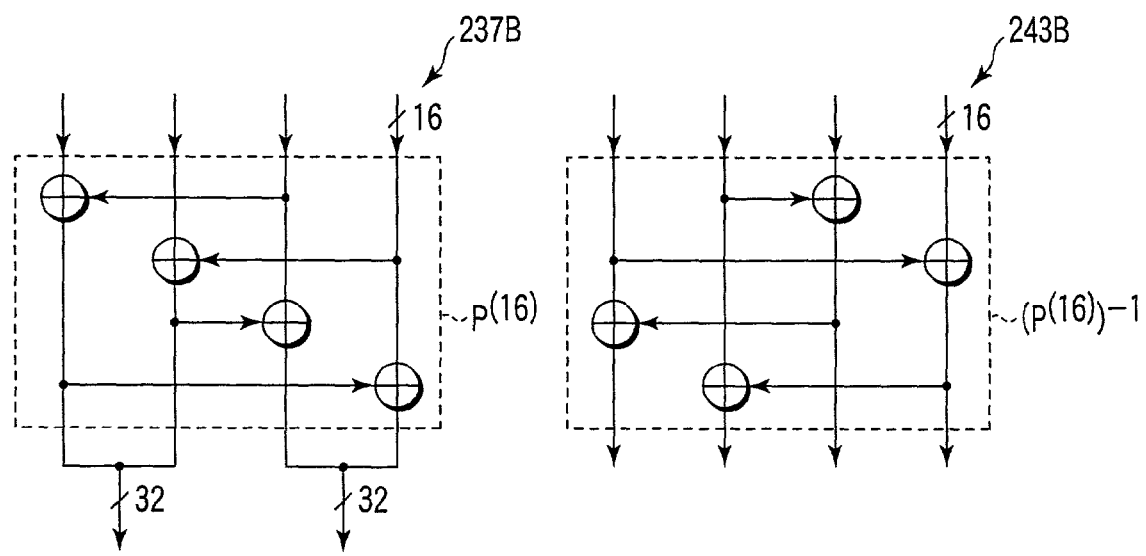
FIGS. 43A and 43B are views illustrating examples of a unit performing an exclusive OR operation shown in FIG. 41.
Figure 48:
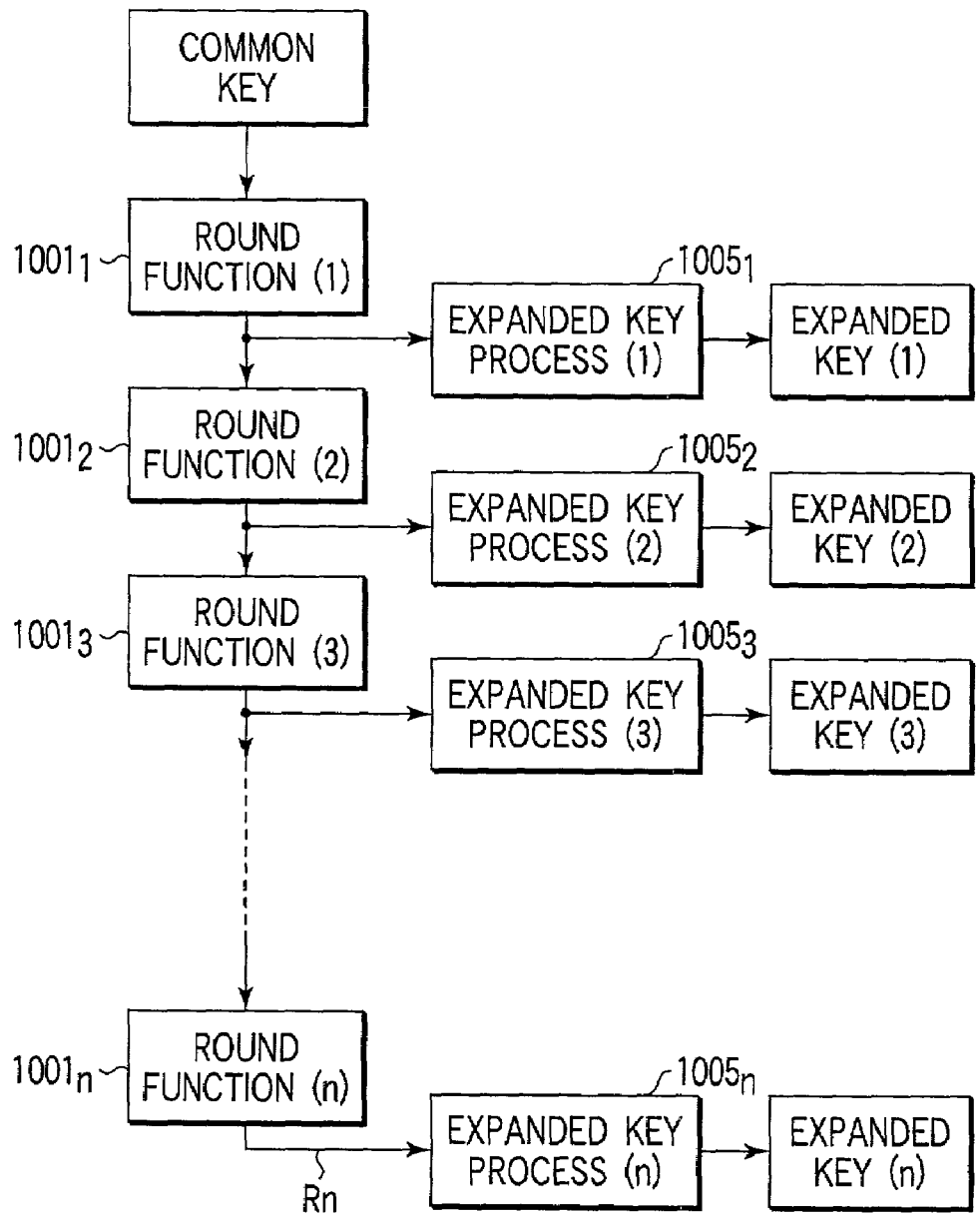
FIG. 48 is a view illustrating a conventional expanded key scheduling apparatus.
Figure 49:
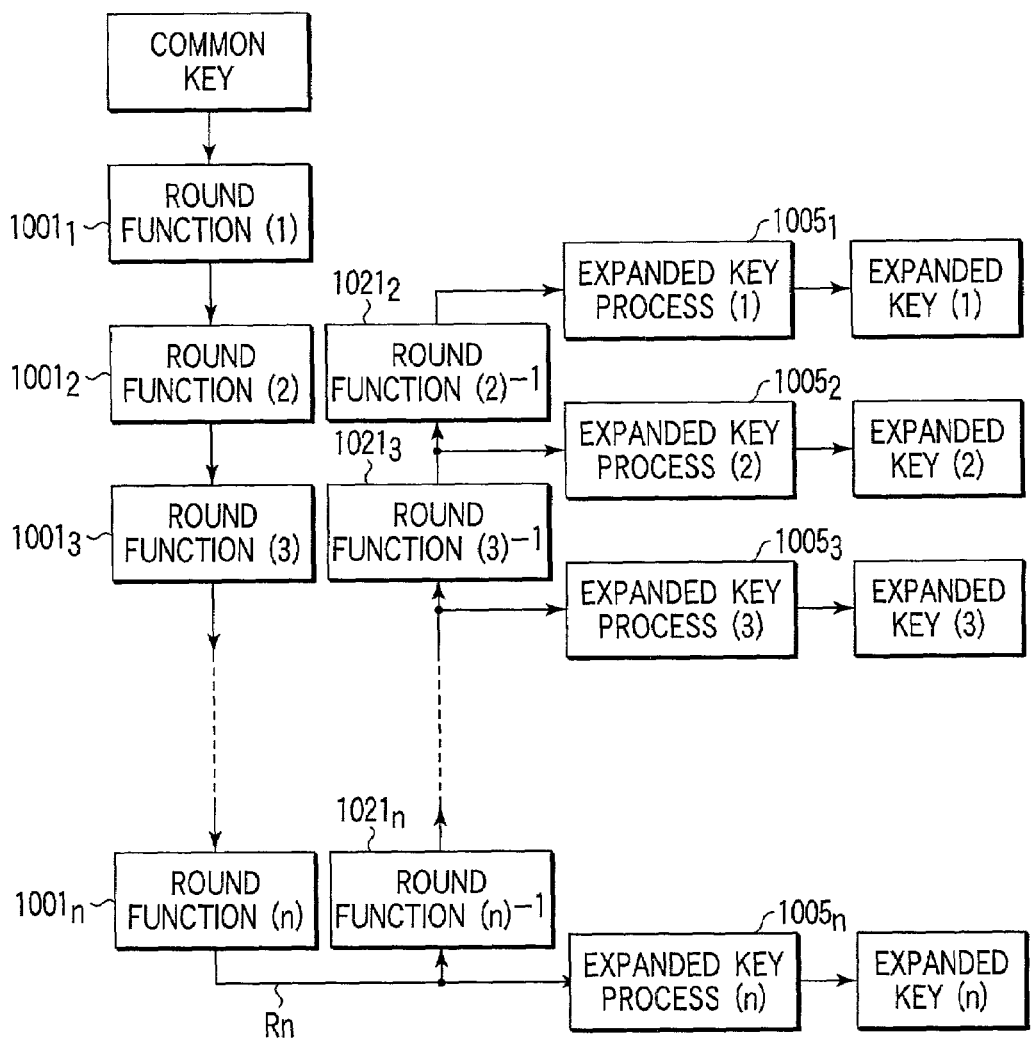
FIG. 49 is a view illustrating anther conventional expanded key scheduling apparatus.

FIG. 43A and FIG. 43B show details of $P^{(16)}$ unit 237B and $(P^{(16)})^{-1}$ unit 243B of FIG. 41. An operation for obtaining an exclusive OR between 16 bits and another 16 bits is performed four times.

The units 239B, 240B, 241B and 242B shown as "5" and "B" in FIG. 41 multiply the elements "5" and "B" of a Galois field GF ($2^4$) with the input.

The constants const(r) that differ depending on each stage and input to the exclusive OR 235 are shown in Table 5. FIG. 44 shows a dummy stage.

TABLE 5

128 bits (6R)

| Expanded Key | Function | Constant | Stage |
|---|---|---|---|
| — | KEp | H_0 | Dummy |
| K1 | KEp | H_1 | 1 |
| K2 | KEp | H_2 | 2 |
| K3 | KEp | H_3 | 3 |
| K4 | KEp | H_4 | 4 |
| K5 | KEc | H_4 | 4 |
| K6 | KEc | H_3 | 3 |
| K7 | KEc | H_2 | 2 |

Hereinafter, a hardware configuration and a software configuration according to the present embodiment will be described.

The encryption apparatus and the decryption apparatus according to the present embodiment can be provided as hardware and software.

The above apparatus according to present embodiment can be provided as a computer readable recording medium having recorded therein a program for providing the encryption apparatus and the decryption apparatus as software, the program causing a computer to execute predetermined means or causing a computer to function as predetermined means or achieve a predetermined function.

In the case of the hardware configuration, the apparatus can be formed as a semiconductor apparatus.

If the encryption apparatus and decryption apparatus to which the present invention is applied is configured or the encryption program or decryption program is generated, although it is possible to individually provide all the blocks or modules, it is also possible to provide one or a proper number of blocks or modules having the same configurations, and to share (use) the blocks or modules at each portion of an algorithm.

In the case of the software configuration, parallel processing is carried out by utilizing a multi-processor, thereby making it possible to speed up processing.

It is possible to configure the above apparatus as an apparatus that has an encryption function, and does not have a decryption function; an apparatus that has a decryption function, and does not have an encryption function; or an apparatus that has both of the encryption and decryption functions. Similarly, it is also possible to configure the above apparatus as a program that has an encryption function, and does not have a decryption function; a program that has a decryption function, and does not have an encryption function; or a program that has both of the encryption and decryption functions.

Now, an application of the present embodiment to a system will be described here.

The encryption system according to the present embodiment is basically applicable to any system.

For example, as shown in FIG. 45, a key is shared safely between a transmitting device 301 and the receiving device 303 in accordance with a predetermined method or procedure; the transmitting device 301 encrypts transmission data for each block length in accordance with an encryption system according to the present embodiment; a ciphertext is transmitted to the receiving device 303 via a communication network 302 in accordance with a predetermined protocol; and the ciphertext is received by the receiving apparatus 303. In the receiving apparatus 303, the received ciphertext is decrypted for each block length by way of the encryption system according to the present embodiment, and an original plaintext can be obtained. If each apparatus has both of the encryption and decryption functions, cipher communication can be made in a bi-directional manner.

For example, as shown in FIG. 46, a computer 311 generates a key in accordance with a predetermined method; and encrypts data desired to be stored for each block length in accordance with the encryption system according to the present embodiment. Then, the computer 311 stores the encrypted data in a data server 313 via a predetermined network 314 (for example, LAN, Internet and the like). When an attempt is made to read the data, the computer 311 reads desired encrypted data from the data server 313, and decodes the read data for each block length in accordance with the encryption system according to the present embodiment, whereby an original plaintext can be obtained. If another computer 312 knows this key, even if decryption is performed similarly, such original plaintext can be obtained. However, another computer that does not know a key cannot decode the encrypted data, thus making it possible to control information security.

For example, as shown in FIG. 47, a contents provider encrypts by using an encryption apparatus 321, thereby encrypt items of contents for each block length by way of one certain key in accordance with the encryption system according to the present embodiment. Then, the contents provider records the encrypted contents in a recording medium 322, and distributes it. A user who has acquired the recording medium 322 obtains the certain key in accordance with a predetermined method, thereby making it possible to decode the contents for each block length by means of the decryption apparatus 323 in accordance with the decryption system according to the present embodiment and to browse or reproduce the contents.

Of course, apart from the foregoing as well, the present invention is applicable to a variety of systems.

According to this embodiment, there is provided an encryption apparatus or a decryption apparatus based on a common key encryption system using a plurality of expanded keys in a reversed order according to a data randomizing process for encryption and a data randomizing process for decryption. The apparatus comprises a round processing circuit which applies a predetermined round function while a common key is input at the first stage, thereby generating a sub key, with respect to plural stages of round functions, and applies a predetermined round function while the sub key generated at the previous stage is input at the second and subsequent stages, thereby generating a new sub key; and an output circuit which leaves all or some bit/bits of bits in the sub key as is or applies a predetermined conversion processing to such all or some bit/bits of bits with respect to each of the sub keys generated at all or some bit/bits of stages of the round a processing circuit, and then, outputs them as the expanded keys. The round processing circuit applies round functions with respect to a plurality of continuous stages from the first stage in all or some bit/bits of a round function series in which a plurality of round functions are dependently connected to each other, the round function series being set so that the last stage generates a value identical to the common key if the common key is input to the first stage, in accordance with the order of the round function series.

According to the present embodiment, a series of round functions for generating expanded keys is set so as to input a common key and output a value identical to that of the common key, thereby making it possible to generate expanded keys from the common key in the on-the-fly manner in during encryption and during decoding both without consumption of an unnecessary delay time or storage capacity that has occurred conventionally.

The configurations shown in the present embodiment are provided as one example, and are not intended to exclude any other configuration. There can be provided another configuration obtained by replacing one part of the embodied configurations with another part; by omitting a part of the embodied configuration; by adding another function to the embodiment configurations; or by combining them. There can also be provided another configuration logically equivalent to the embodied configurations; another configuration including a portion logically equivalent to that of the embodiment configuration; or another configuration logically equivalent to essential portions of the embodied configurations. There can be provided another configuration in which the identical or analogous effect to that of the embodied configurations is achieved.

A plurality of variations with respect to a variety of constituent elements can be carried out by properly combining them.

The present invention is not limited to the above described embodiment, and various modifications can occur without departing the technical scope of the invention.

The present invention can be provided as a computer readable recording medium having recorded therein a program causing a computer to execute predetermined means, causing a computer to function as predetermined means, or causing a computer to achieve a predetermined function.

What is claimed is:

1. An encryption apparatus based on a common key encryption system in which a plurality of expanded keys are used in a predetermined order in a data randomizing process for encryption and in a reversed order in a data randomizing process for decryption, the apparatus comprising:
   a plurality of round processing circuits connected in series, the round processing circuit of a first stage receiving a common key and subjecting the received common key to a round function to output a sub key and the round processing circuit of subsequent stages receiving the sub key output from the round processing circuit of a previous stage and subjecting the sub key to a round function to output a sub key, the sub key output from the round processing circuit of a last stage being the common key; and
   a plurality of expanded key generating circuits configured to receive the sub keys output from at least a part of said round processing circuits and output expanded keys based on all or some bits of the received sub keys, wherein the plurality of round processing circuits comprise a first portion including at least two round processing circuits having first and second round functions and a second portion which follows the first portion, the second portion including at least two round processing circuits having third and fourth round functions, the third round function being an inverse of the second round function, and the fourth round function being an inverse of the first round function.

2. The encryption apparatus according to claim 1, wherein said plurality of expanded key generating circuits subject the all or some bits of the received sub keys to a predetermined conversion processing to output the expanded keys.

3. The encryption apparatus according to claim 1, wherein the round function of the round processing circuit of i-th stage is an inverse function of the round function of the round processing circuit of (j−i+1)-th stage, j being an half of the total number of stages of round processing circuits and i being 1 to j.

4. The encryption apparatus according to claim 1, further comprising a selector configured to select some of the sub keys output from said plurality of round processing circuits, the selected sub keys being supplied to said plurality of expanded key generating circuits.

5. The encryption apparatus according to claim 4, wherein said selector selects the sub keys output from round processing circuits other than a first group of round processing circuits including the round processing circuit of the first stage and a second group of round processing circuits including the round processing circuit of the last stage.

6. The encryption apparatus according to claim 4, wherein said selector selects one of the sub key output from a round processing circuit of i-th stage and the sub key output from a round processing circuit of (j−i+1)-th stage, j being an half of the total number of stages of the round processing circuits and i being 1 to j.

7. The encryption apparatus according to claim 1, wherein said plurality of expanded key generating circuits change an order of the sub keys generated from said plurality of round processing circuits and generates the expanded keys in a changed order.

8. The encryption apparatus according to claim 1, wherein said plurality of expanded key generating circuits generate the expanded keys in number exceeding the number of expanded keys required for the data randomizing process and output an expanded common key indicating which expanded keys are supplied to the data randomizing process.

9. The encryption apparatus according to claim 1, wherein the plurality of round processing circuits comprise a first half of round processing circuits and a second half of round processing circuits, a round function of the first half of round processing circuits being inverse to a round function of the second half of round processing circuits.

10. The encryption apparatus according to claim 1, wherein the plurality of round processing circuits comprise a first half of round processing circuits and a second half of round processing circuits, round functions of the first half of round processing circuits being inverse to round functions of the second half of round processing circuits.

11. The encryption apparatus according to claim 1, wherein each of the round processing circuits in the two round processing circuit having first and second round functions, comprises logic elements and a plurality of output terminals, such that the plurality of output terminals are connected to different logic elements so that different sub keys are output from each output terminal.

12. The encryption apparatus according to claim 1, wherein each of the round processing circuits in the two round processing circuits having first and second round functions, comprises corresponding logic elements wherein the logic elements of each round processing circuit are interconnected differently, so as to output different sub keys.

13. A decryption apparatus based on a common key encryption system in which a plurality of expanded keys are used in a predetermined order in a data randomizing process for encryption and in a reversed order in a data randomizing process for decryption, the apparatus comprising:
   a plurality of round processing circuits connected in series, the round processing circuit of a first stage receiving a common key and subjecting the common key to a round function to output a sub key and the round processing circuit of subsequent stages receiving the sub key output from the round processing circuit of a previous stage and subjecting the sub key to a round function to output a sub key, the sub key output from the round processing circuit of a last stage being the common key; and
   a plurality of expanded key generating circuits configured to receive the sub keys output from at least a part of said round processing circuits and output expanded keys based on all or some bits of the received sub keys, wherein the plurality of round processing circuits comprise a first portion including at least two round processing circuits having first and second round functions and a second portion which follows the first portion, the second portion including at least two round processing circuits having third and fourth round functions, the third round function being an inverse of the second round function, and the fourth round function being an inverse of the first round function.

14. The decryption apparatus according to claim 13, characterized in that said plurality of expanded key generating circuits subject the all or some bits of the received sub keys to a predetermined conversion processing to output the expanded keys.

15. The decryption apparatus according to claim 13, wherein the plurality of round processing circuits comprise a first half of round processing circuits and a second half of round processing circuits, a round function of the first half of round processing circuits being inverse to a round function of the second half of round processing circuits.

16. The decryption apparatus according to claim 13, wherein the plurality of round processing circuits comprise a first half of round processing circuits and a second half of round processing circuits, round functions of the first half of round processing circuits being inverse to round functions of the second half of round processing circuits.

17. The decryption apparatus according to claim 13, wherein the two round processing circuits having first and second round functions comprise logic elements and output different sub keys from different terminals connected to different logic elements.

18. The decryption apparatus according to claim 13, wherein the two round processing circuits having first and second round functions comprise logic elements connected to each other in a different manner to output different sub keys.

19. An expanded key generation apparatus used for an encryption apparatus including a data randomizing process using a plurality of expanded keys in a predetermined order and a decryption apparatus including a data randomizing process using the plurality of expanded keys in a reversed order which are based on a common key encryption system, the apparatus comprising:
 a plurality of round processing circuits connected in series, the round processing circuit of a first stage receiving a common key and subjecting the common key to a round function to output a sub key and the round processing circuit of subsequent stages receiving the sub key output from the round processing circuit of a previous stage and subjecting the sub key to a round function to output a sub key, the sub key output from the round processing circuit of a last stage being the common key; and
 a plurality of expanded key generating circuits configured to receive the sub keys output from at least a part of said round processing circuits and output expanded keys based on all or some bits of the received sub keys, wherein the plurality of round processing circuits comprise a first portion including at least two round processing circuits having first and second round functions and a second portion which follows the first portion, the second portion including at least two round processing circuits having third and fourth round functions, the third round function being an inverse of the second round function, and the fourth round function being an inverse of the first round function.

20. The expanded key generation apparatus according to claim 19, wherein said plurality of expanded key generating circuits subject the all or some bits of the received sub keys to a predetermined conversion processing to output the expanded keys.

21. An expanded key generation method used for an encryption apparatus based on a common key encryption system in which a plurality of expanded keys are used in a predetermined order in a data randomizing process for encryption in a reversed order in a data randomizing process for decryption, the method comprising:
 subjecting a received common key to a round function to output a sub key by a round processing circuit of a first stage;
 subjecting the sub key output from the round processing circuit of a previous stage to a round function to output a sub key by round processing circuits of subsequent stages, the round processing circuits of the subsequent stages comprising a first portion including at least two round processing circuits having first and second round functions and a second portion which follows the first portion, the second portion including at least two round processing circuits having third and fourth round functions, the third round function being an inverse of the second round function, and the fourth round function being an inverse of the first round function, the sub key output from the round processing circuit of a last stage being the common key; and
 generating expanded keys based on all or some bits of the sub keys from a plurality of round processing circuits.

22. An expanded key generation method used for a decryption apparatus based on a common key encryption system in which a plurality of expanded keys are used in a predetermined order in a data randomizing process for encryption and in a reversed order in a data randomizing process for decryption, the method comprising:
 subjecting a received common key to a round function to output a sub key by a round processing circuit of a first stage;
 subjecting the sub key output from the round processing circuit of a previous stage to a round function to output a sub key by round processing circuits of subsequent stages, the round processing circuits of the subsequent stages comprising a first portion including at least two round processing circuits having first and second round functions and a second portion which follows the first portion, the second portion including at least two round processing circuits having third and fourth round functions, the third round function being an inverse of the second round function, and the fourth round function being an inverse of the first round function, the sub key output from the round processing circuit of a last stage being the common key; and
 generating expanded keys based on all or some bits of the sub keys from a plurality of round processing circuits.

23. An article of manufacture comprising a computer usable medium having an expanded key generation program embodied therein, the expanded key generation program used for an encryption apparatus based on a common key encryption system in which a plurality of expanded keys are used in a predetermined order in a data randomizing process for encryption and in a reversed order in a data randomizing process for decryption, the program comprising:
 computer readable program code means for causing a computer to subject a common key to a round function to output a sub key of a first stage;
 computer readable program code means for causing a computer to subject the sub key of a previous stage to round functions to output sub keys of subsequent stages, the round functions of the subsequent stages comprising a first portion including at least two stages having first and second round functions and a second portion which follows the first portion, the second portion including at least two stages having third and fourth round functions, the third round function being an inverse of the second round function, and the fourth round function being an inverse of the first round function, the sub key of a last stage being the common key; and computer readable program code means for causing a computer to generate expanded keys based on all or some bits of the sub keys.

24. An article of manufacture comprising a computer usable medium having an expanded key generation program embodied therein, the expanded key generation program used for a decryption apparatus based on a common key encryption system in which a plurality of expanded keys are used in a predetermined order in a data randomizing process for encryption and in a reversed order in a data randomizing process for decryption, the program comprising:

computer readable program code means for causing a computer to subject a common key to a round function to output a sub key of a first stage;

computer readable program code means for causing a computer to subject the sub key of a previous stage to round functions to output sub keys of subsequent stages, the round functions of the subsequent stages comprising a first portion including at least two stages having first and second round functions and a second portion which follows the first portion, the second portion including at least two stages having third and fourth round functions, the third round function being an inverse of the second round function, and the fourth round function being an inverse of the first round function, the sub key of a last stage being the common key; and computer readable program code means for causing a computer to generate expanded keys based on all or some bits of the sub keys.

* * * * *